US006835272B1

(12) United States Patent
Lee

(10) Patent No.: US 6,835,272 B1
(45) Date of Patent: Dec. 28, 2004

(54) MULTICOLORED STEEL SHEET MANUFACTURING METHOD AND A MULTICOLORED STEEL SHEET MANUFACTURING SYSTEM

(76) Inventor: Chang-Won Lee, Sinsaegae Apt. 11-1201, Soosung-gu, Soosung 1 ga 613, Taegu (KR), 706-031

( * ) Notice: Subject to any disclaimer, the term of this patent is extended or adjusted under 35 U.S.C. 154(b) by 0 days.

(21) Appl. No.: 10/221,155

(22) PCT Filed: Mar. 17, 2000

(86) PCT No.: PCT/KR00/00225

§ 371 (c)(1),
(2), (4) Date: Jun. 20, 2003

(87) PCT Pub. No.: WO01/68944

PCT Pub. Date: Sep. 20, 2001

(51) Int. Cl.[7] ......................... B32B 31/12; B32B 35/00; C23C 28/00; B41M 1/18

(52) U.S. Cl. ....................... 156/277; 156/387; 101/115; 101/129; 101/171; 101/211; 101/487; 101/490

(58) Field of Search ................................ 156/277, 384, 156/387; 101/115, 129, 171, 202, 211, 483, 487, 490

(56) References Cited

U.S. PATENT DOCUMENTS 5,597,436 A * 1/1997 Ooyagi et al. .............. 156/259
5,916,723 A * 6/1999 Hand ......................... 430/126
5,970,865 A * 10/1999 Horth et al. .................. 101/40
6,103,043 A * 8/2000 Lin ............................ 156/237
6,375,782 B1 * 4/2002 Kumar et al. ............... 156/230

FOREIGN PATENT DOCUMENTS

| | | | |
|---|---|---|---|
| GB | 2 128 933 | * | 5/1984 |
| JP | 56-75890 | * | 6/1981 |
| JP | 63-62576 | * | 3/1988 |
| JP | 5-15839 | * | 1/1993 |
| JP | 2000-79677 | * | 3/2000 |

* cited by examiner

*Primary Examiner*—Melvin C. Mayes
(74) *Attorney, Agent, or Firm*—Jacobson Holman PLLC

(57) ABSTRACT

A method of manufacturing a multicolored steel sheet having multiple colors, designs or patterns on its surface and a manufacturing system for carrying out the same are provided. The method comprises a printing process of printing on the surface of a steel sheet with a dye of the first single color, a drying process of drying the one-color printed steel sheet, a cooling process of cooling the dried steel sheet, a printing process of printing with a dye of a second color, a drying process of drying the two-color printed steel sheet, a cooling process of cooling the dried steel sheet, a printing process of printing with a dye of a third color, a drying process of drying three-color printed steel sheet, a cooling process of cooling the dried steel sheet, a printing process of printing with a dye of a fourth color, a drying process of drying the four-color printed steel sheet, a cooling process of cooling the dried steel sheet, a coating process of coating the printed and dried steel sheet with a paste, a drying process of drying the pasted steel sheet, a cooling process of cooling the coated and dried steel sheet, and a laminating process of laminating the surface of the steel sheet with a protective film so as to manufacture a multicolored steel sheet.

11 Claims, 25 Drawing Sheets

FIG 2 CONTINUATION
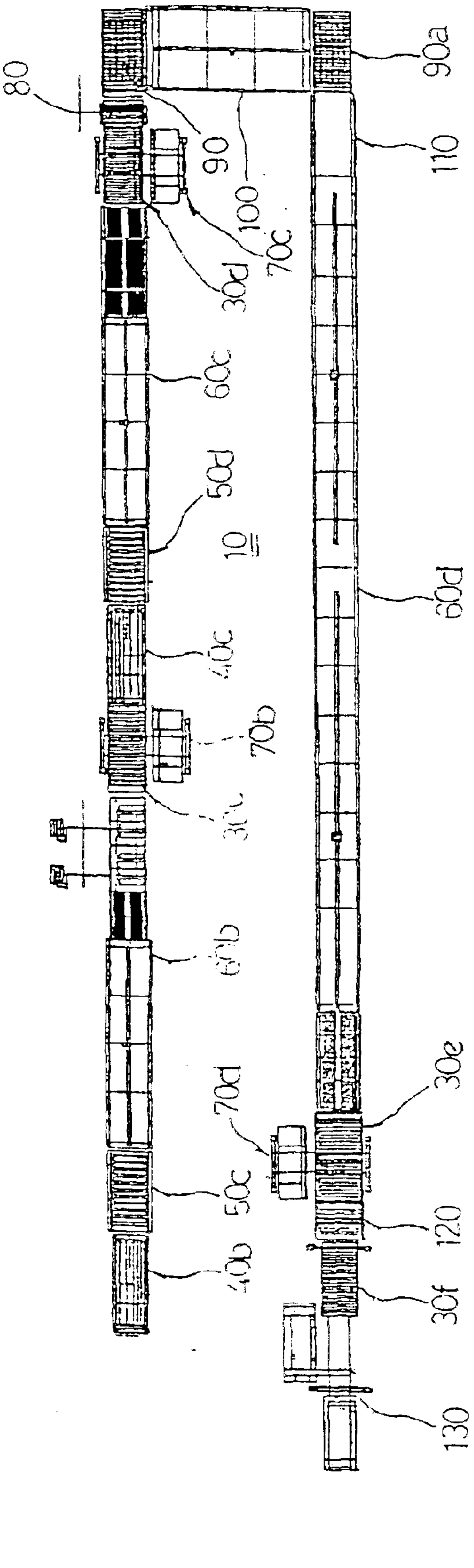

MULTICOLORED STEEL SHEET MANUFACTURING METHOD AND A MULTICOLORED STEEL SHEET MANUFACTURING SYSTEM

This is a nationalization of PCT/KR00/00225 filed Mar. 17, 2000 and published in English.

TECHNICAL FIELD

The present invention relates to a multicolored steel sheet manufacturing method and a multicolored steel sheet manufacturing system, more particularly a method of manufacturing a multicolored steel sheet on the surface of which a variety of figures, designs or patterns can be printed in elegant, solid colors, and a manufacturing system for carrying out the same efficiently.

BACKGROUND ART

For these conventional colored steel sheets, a single-color dye was applied to the surface and the designs engraved on the surface were mostly monotonous, so they could not satisfy the various needs of users who want an aesthetic sense of more various, refined images that go well with the atmosphere of each field.

Thus, in the recent days, diversified attempts have been made to manufacture a multicolored steel sheet on the surface of which designs or patterns are engraved in more varied colors, using dyes of various colors. However, such attempts have not give satisfactory results.

Practically, a few multicolored steel sheet products have designs or patterns in various colors on the surface. But the colored state of the surface designs or patterns are very inferior and the process of color printing requires considerable time. The price is comparatively high because the manufacture is very complicated.

Also, the conventional multicolored steel sheets have a decisive shortcoming that a crack or scratch on the surface of the dye occurs when bending or folding steel sheets or when a slight impact is applied.

It is true that the foregoing problems that the conventional multicolored steel sheets have became direct factors which affect the spread of multicolored steel sheets. Therefore, the manufacture of a new multicolored steel sheet which can make up for these problems is urgently needed at present.

DISCLOSURE OF INVENTION

The present invention, invented to solve the foregoing problems that a conventional multicolored steel sheet has, provides a multicolored steel sheet manufacturing method which allows a multicolored steel sheet to have various colors and designs, to have very low occurrence of a crack or scratch, and to be mass-produced at a moderate price according to the purchasers' need for design and color, and a multicolored steel sheet manufacturing system which can achieve the same method efficiently.

BRIEF DESCRIPTION OF THE DRAWINGS

FIG. 6B is a plan view roughly showing the first, second, third and fourth feeding means selected according to the present invention;

EXPLANATION OF PRINCIPAL ELEMENTS SHOWN ON THE DRAWINGS

| | | | |
|---|---|---|---|
| 10: | Multicolored steel sheet | | |
| 20: | Charging means manufacturing system | | |
| 21, 22: | Guide rail | 23: | Supply area |
| 24, 25: | Charging magazine | 26: | Supplying frame |
| 27: | Supplying cart | 28: | Supplying arm |
| 29: | Air pad | | |
| 30,30a,30b,30c, 30d,30e,30f: | 1st,2nd,3rd,4th,5th,6th& 7th arranging means | | |
| 31: | Frame | 32: | Supplying roller |
| 33: | Fixing pin | 34: | Cylinder |
| 35: | Positioning pin | | |
| 40,40a,40b,40c: | 1st, 2nd, 3rd, & 4th printing means | | |
| 41: | Frame | 42: | Workbench |
| 43: | Screen frame | | |
| 50,50a,50b,50c: | 1st, 2nd, rd & 4th feeding means | | |
| 51: | Frame | | |
| 52: | Feeding roller | | |
| 60,60a,60b,60c, 60d: | 1st, 2nd, 3rd, | | |
| 61: | drying casing 4th & 5th drying & cooling means | | |
| 62: | Cooling casing | 63: | Drying chamber |
| 64: | Cooling chamber | 65: | Feeding belt |
| 66: | I · R heater | 67: | Blast fan |
| 68: | Discharge fan | 68a: | Cooling fan |
| 70,70a,70b,70c, 70d: | 1st, 2nd, 3rd, 4th | | |
| 71: | Discharging frame& 5th discharging means | | |
| 73: | Discharging cart | 74: | Discharging arm |
| 75: | Air pad | 76: | Discharging magazine |
| 77: | Caster | 80: | Coating means |
| 81: | Frame | 82: | Feeding roller |
| 83: | Supply nozzle | 90,90a: | 1st & 2nd turning means |
| 91: | Frame | 92: | Feeding roller |
| 93: | Quick feeding plate | 94: | Quick feeding roller |
| 100: | Drying means | 101: | Casing |
| 102: | Drying chamber | 103: | Feeding belt |
| 104: | I · R heater | 105: | Blast fan |
| 106: | Discharge fan | 110: | Preliminary drying means |
| 111: | Casing | 112: | Drying chamber |
| 113: | Feeding belt | 114: | Blast fan |
| 115: | I · R heater | 116: | Discharge fan |
| 120: | Laminating means | 121: | Frame |
| 122: | Bonding roller | 123: | Protective film |
| 130: | Receiving means | 131,132: | Guide rail |
| 133: | Collecting area | 134,135: | Collecting magazine |
| 136: | Collecting frame | 137: | Collecting cart |
| 138: | Collecting arm | 139: | Air pad |
| M1,M1a,M2,M3, M5M6,M7,M8, M9: | Driving motor | | |
| M10,M11,M12, M13,M14,M14a, M15: | Driving motor | | |

BEST MODE FOR CARRYING OUT THE INVENTION

The present invention is widely dividedly into two areas; one is a multicolored steel sheet manufacturing method and the other is a multicolored steel sheet manufacturing system.

A multicolored steel sheet manufacturing method is explained below in the first place.

Figure 1:
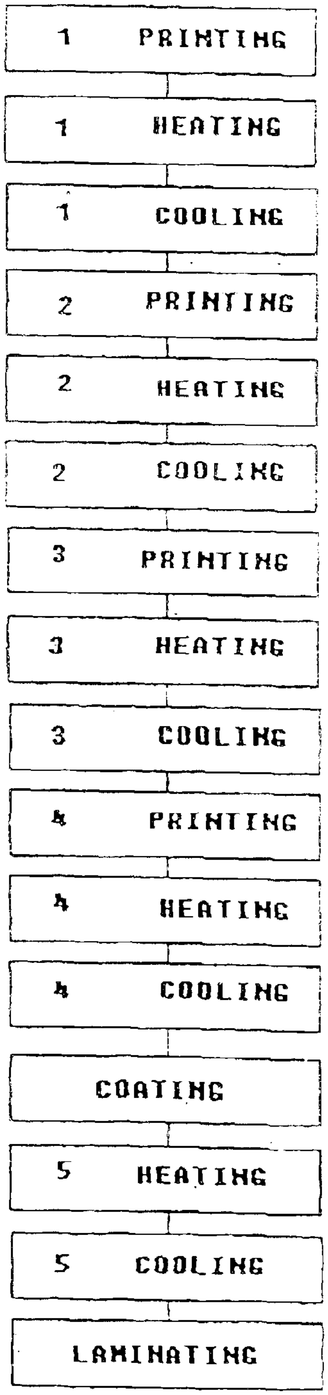
FIG. 1 is a process drawing of a multicolored steel sheet manufacturing method that the present invention presents.

As shown in FIG. 1 which is a process process drawing of a multicolored steel sheet manufacturing method that the present invention presents, the method comprises the sixteen steps of process—the 1st printing process, the 1st drying process, the 1st cooling process, the 2nd printing process, the 2nd drying process, the 2nd cooling process, the 3rd printing process, the 3rd drying process, the 3rd cooling process, the 4th printing process, the 4th drying process, the 4th cooling process, the surface coating process, the 5th drying process, 5th cooling process, and the laminating process—which should be carried out to manufacture a multicolored steel sheet according to the present invention. Detailed composition and operation of each step of process are as follows.

[Step 1]

This process is the 1st printing process for printing on the surface of a steel sheet in the 1st single color, and uses the screen printing. With the screen having mesh points formed in the shape of a desired design being in close contact with the surface of a steel sheet, a dye of the 1st single color is put on the screen. Then, the squeegee is moved back and forth on the screen to pass the dye of the 1st single color through the mesh points so that the one-color printing is done on the surface of a steel sheet.

[Step 2]

This process is the 1st drying process for drying the 1st color printed steel sheet, which is designed to dry the dye by drying the printed steel sheet at a temperature between 150° C. and 400° C. This process makes tie dye dry to some extent and firmly stick fast to the surface of the steel sheet.

When the temperature was 100° C, or below during this process, the dried state of the dye was poor and the dye did not stick fast to the surface of the steel sheet.

[Step 3]

This process is the 1st cooling process for cooling the dried steel sheet. In this process, the steel sheet which went through the drying process is forcedly cooled to −10° C.~40° C. by means of the air conditioner and fan so that the dye printed on the surface of the steel sheet is completely dried. This process facilitates the quick progress of the incoming process.

Actually, the dye on the steel sheet having an elevated temperature after going through the drying process is not considered to have been completely dried, so it cannot be carried to the incoming printing process.

[Step 4]

This process is the 2nd printing process for printing on the surface of the 1st-printed and dried steel sheet in the 2nd single color. With the screen having mesh points formed in the shape of a design being in the same series as that used in the 1st printing process being in close contact with the surface of a steel sheet, a dye of the 2nd single color is put on the screen. Then, the squeegee is moved back and forth on the screen to pass the dye of the second single color through the mesh points so that the two-color printing is done on the surface of a steel sheet.

[Step 5]

This process is the 2nd drying process for drying the 2rd color printed steel sheet, which is designed to dry the dye by drying the printed steel sheet at a temperature between 150° C. and 400° C. This process makes the 2nd printed dye dry to some extent and firmly stick fast to the surface of the steel sheet.

[Step 6]

This process is the 2nd cooling process for cooling the dried steel sheet. In this process, the steel sheet which went through the 2nd drying process is forcedly cooled to −10° C.~40° C. by means of the air conditioner and fan so that the dye printed on the surface of the steel sheet is completely dried. This process facilitates the quick progress of the incoming process.

[Step 7]

This process is the 3rd printing process for printing on the surface of a steel sheet in the 3rd single color, and uses the screen printing. With the screen having mesh points formed in the shape of a desired design being in close contact with the surface of a steel sheet, a dye of the 3rd single color is put on the screen. Then, the squeegee is moved back and forth on the screen to pass the dye of the 3rd single color through the mesh points so that the three-color printing is done on the surface of a steel sheet.

[Step 8]

This process is the 3rd drying process for drying the 3rd color printed steel sheet, which is designed to dry the dye by drying the printed steel sheet at a temperature between 150° C. and 400° C. This process makes the dye dry to some extent and firmly stick fast to the surface of the steel sheet.

When the temperature was 100° C. or below during this process, the dried state of the dye was poor and the dye did not stick fast to the surface at the steel sheet.

[Step 9]

This process is the 3rd cooling process for cooling the dried steel sheet. In this process, the steel sheet which went through the drying process is forcedly cooled to −10° C.~40° C. by means of the air conditioner and fan so that the dye printed on the surface of the steel sheet is completely dried. This process facilitates the quick progress of the incoming process.

Actually, the dye on the steel sheet having an elevated temperature after going through the drying process is not considered to have been completely dried, so it cannot be carried to the incoming printing process.

[Step 10]

This process is the 4th printing process for printing on the surface of the 3rd-printed and dried steel sheet in the 4th single color. With the screen having mesh points formed in the shape of a design being in the same series as that used in the 3rd printing process being in close contact with the surface of a steel sheet, a dye of the 4th single color is put on the screen. Then, the squeegee is moved back and forth on the screen to pass the dye of the second single color through the mesh points so that the four-color printing is done on the surface of a steel sheet.

[Step 11]

This process is the 4th drying process for drying the 4th color printed steel sheet, which is designed to dry the dye by drying the printed steel sheet at a temperature between 150° C. and 400° C. This process makes the 4th printed dye dry to some extent and firmly stick fast to the surface of the steel sheet.

[Step 12]

This process is the 4th cooling process for cooling the dried steel sheet. In this process, the steel sheet which went through the 4th drying process is forcedly cooled to −10° C.~40° C. by means of the air conditioner and fan so that the dye printed on the surface of the steel sheet is completely dried. This process facilitates the quick progress of the incoming process.

[Step 13]

This process is a coating process for coating the surface of the printed and dried steel sheet with transparent, viscous paste. The steel sheet where printing and drying were finished is passed through between feeding rollers arranged vertically and the paste is applied to the surface of the steel sheet in a uniform thickness to protect the dye color and design on the surface of the steel sheet.

[Step 14]

This process is the 5th drying process for drying the steel sheet coated with the paste, which is designed to dry the paste by drying the steel sheet coated with the paste at a temperature between 150° C. and 400° C. This process makes the paste dry to some extent and firmly stick fast to the dye printed on the steel sheet.

[Step 15]

This process is the 5th cooling process for cooling the coated and dried steel sheet. In this process, the steel sheet which went through the 5th drying process is forcedly cooled to −10° C.~40° C. by means of the air conditioner and fan so that the paste coated on and dye printed on the surface of the steel sheet is completely dried. This process facilitates the quick progress of the incoming process.

[Step 16]

This process is a laminating process for laminating the surface of the steel sheet that went through the final process with a synthetic resin film. A thin synthetic resin film is laminated on the printed surface of the steel sheet so as to be kept in a vacuum state to minimize damages to the printed surface during transportation of the steel sheet.

Designs in four or more colors could be printed on the surface of a steel sheet by repeatedly performing the above processes from Step 1 to Step 12 with a plurality of screens having a series of designs. As the drying and cooling processes were carried out several times with the steel sheet printed the dye so that the dye could firmly stick fast to the surface of the steel sheet and have a considerably excellent durability, no cracks or no scratches occurred on the dye printed on the surface of the steel sheet when the multicolored steel sheet was folded or bent or when a certain impact was applied to its surface.

The following is a detailed explanation of composition and operation of a multicolored steel sheet manufacturing system that the present invention presents.

Figure 2:
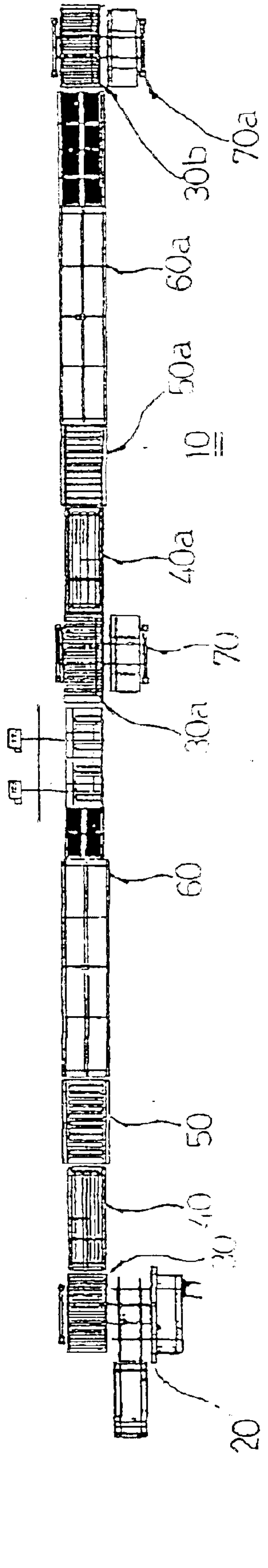
FIG. 2 is a layout of a multicolored steel sheet manufacturing system that the present invention presents.

As shown in FIG. 2 showing the layout of a multicolored steel sheet manufacturing system that the present invention presents, the multicolored steel sheet manufacturing system comprises such structural elements as the charging means (20), 1st arranging means(30), 1st printing means(40), 1st feeding means(50), 1st drying & cooling means(60), 2nd arranging means**(30*a*), 1st discharging means(70), 2nd printing means(40), 2nd feeding means(50*a*), 2nd drying & cooling means(60*a*), 3rd arranging means(30*b*), 2nd discharging means(70*a*), 3rd printing means(40*b*), 3rd feeding means(50*b*), 3rd drying & cooling means(60*b*), 4th arranging means(30*c*), 3rd discharging means(70*b*), 4th printing means(40*c*), 4th feeding means(50*c*), 4th drying & cooling means(60*c*), 5th arranging means(30*d*), 4th discharging means(70*c*), coating means(80), 1st turning means(90), drying means(100), 2nd turning means(90*a*), preliminary drying means(110), 5th drying & cooling means(60*d*), 6th arranging means(30*e*), 5th discharging & means(70*d*), laminating means(120), 7th arranging means(30*f*), and receiving means(130), which are organically linked together. Each structural elements are lined in order in the shape of "⊃" by the 1st and 2nd turning means(90 and 90*a*)** which are located intermediately, so that the starting and ending processes for printing on the steel sheet are performed.

Figure 3A:
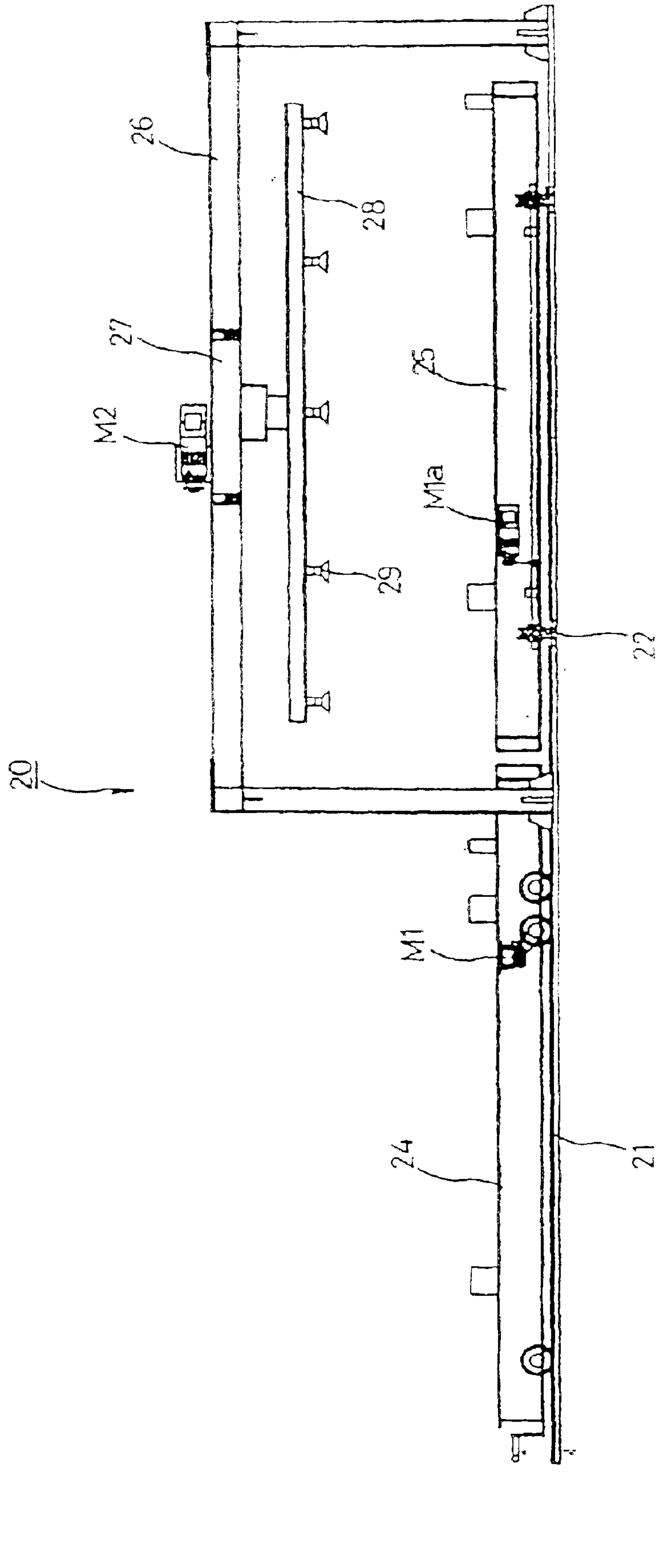
FIG. 3A is a front view roughly showing the charging means selected according to the present invention.
Figure 3B:
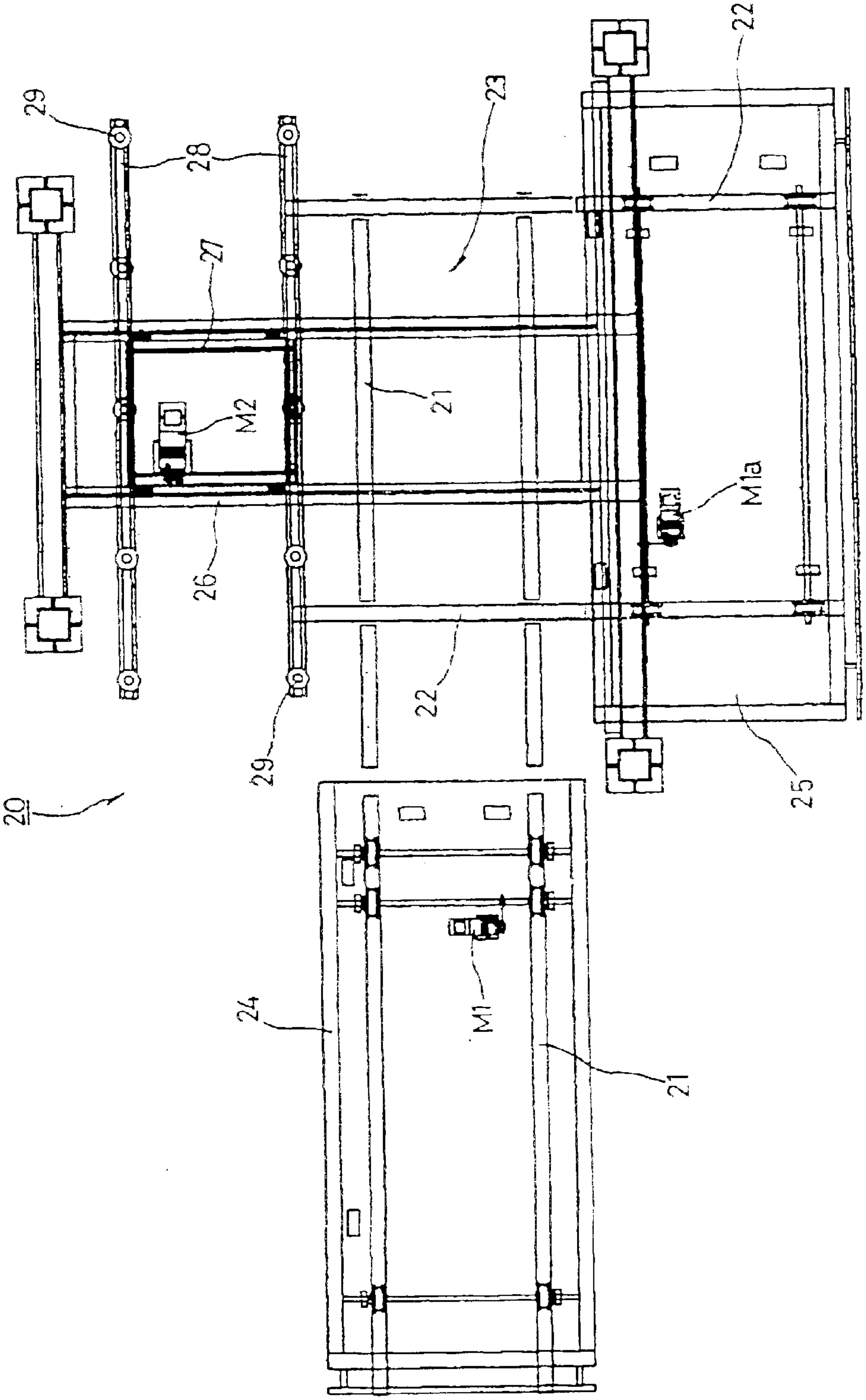
FIG. 3B is a plan view roughly showing the charging means selected according to the present invention.

FIGS. 3A and 3B are a front view and a plan view, respectively, roughly showing the charging means(20)

selected according to the present invention. As shown in FIGS. 3A and 3B, two sets of guide rails(21, 22) are installed so as to be perpendicularly across, between which the supply area(23) is formed and on which charging magazines(24, 25) are placed on the guide rails(21, 22) so that the charging magazines go into the supply area(23) in turn by means of driving motors(M1, M1*a*). A supplying frame(26) is installed across over the supply area(23), on which a supplying cart(27), movable up and down by a driving motor (M2), is placed. A liftable supplying arm(28) is installed on the supplying cart(27). A plurality of air pads(29) are mounted at the bottom of the supplying arm(28) for carrying materials.

Figure 4A:
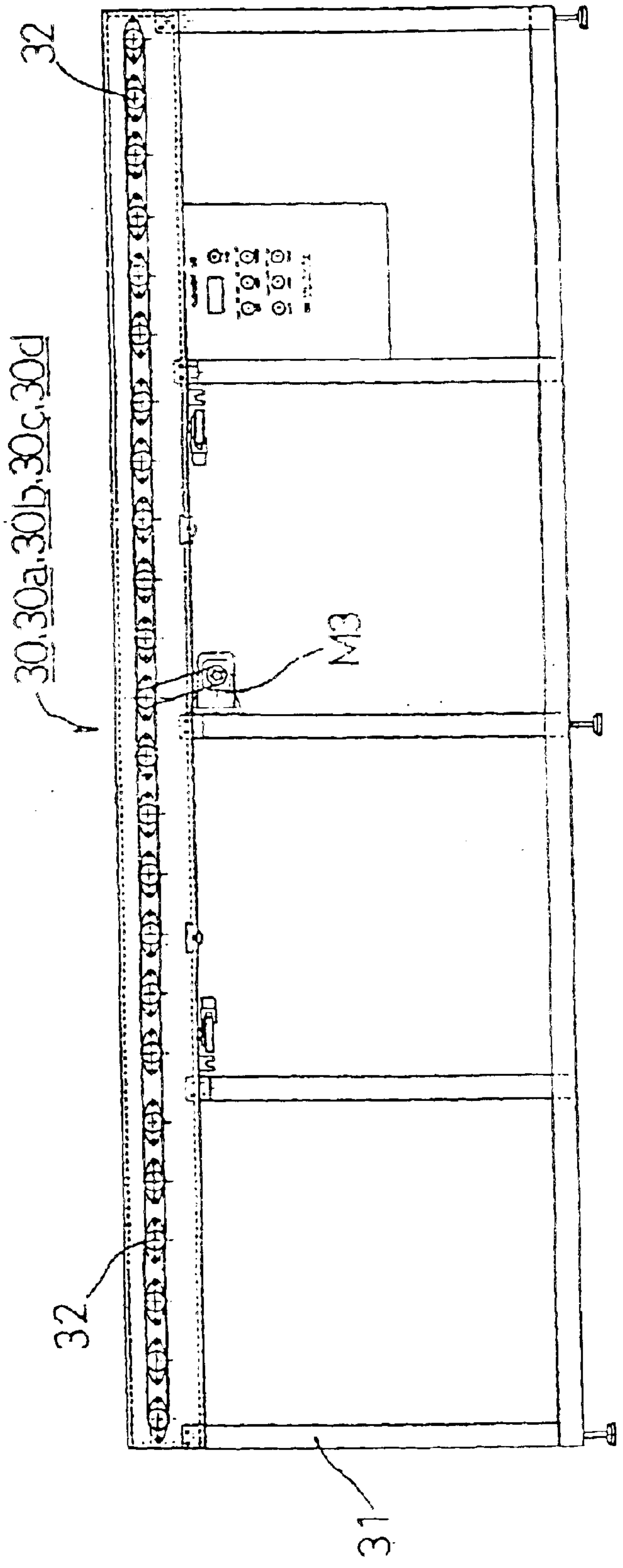
FIG. 4A is a front view roughly showing the first, second, third, fourth, fifth, sixth and seventh arranging means selected according to the present invention.
Figure 4B:
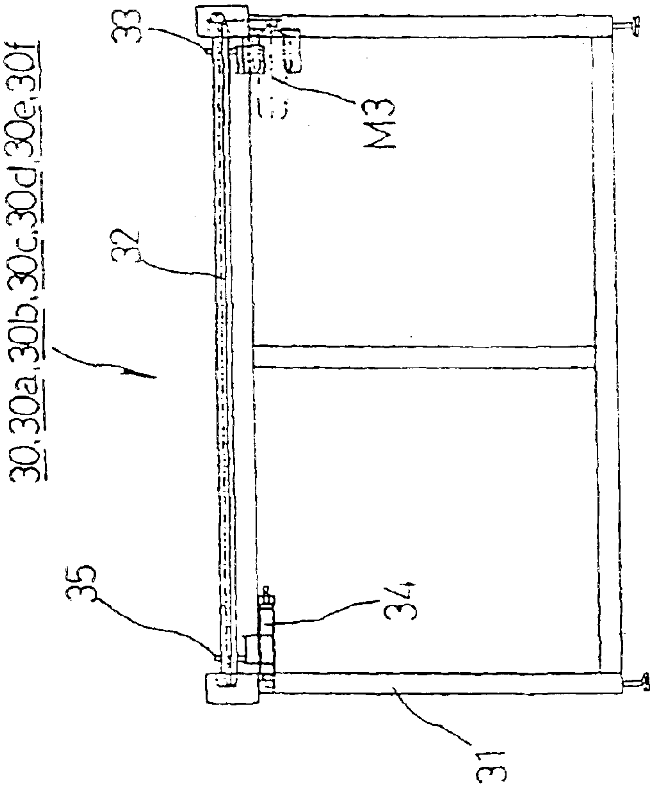
FIG. 4B is a side view roughly showing the first, second, third, fourth, fifth, sixth and seventh arranging means selected according to the present invention.

The 1st arranging means(30) is installed, parallel with the supply area(23), so as to be connected to one side of supplying frame(26) of the charging means(20) configured as above. FIGS. 4A and 4B are a front view and a plan view, respectively, roughly showing the 1st arranging means(30) selected according to the present invention As shown in FIGS. 4A and 4B, a plurality of supplying rollers(32), being capable of accepting the width of materials to be charged, are installed axially on a frame(31) so as to be driven by means such as a driving motor(M3) and belts fitted together. A fixing pin(33) is mounted in one upper side of the arranging means(30), and a positioning pin(35), expansible back and forth by a cylinder(34), is mounted on the other opposite side.

Figure 5A:
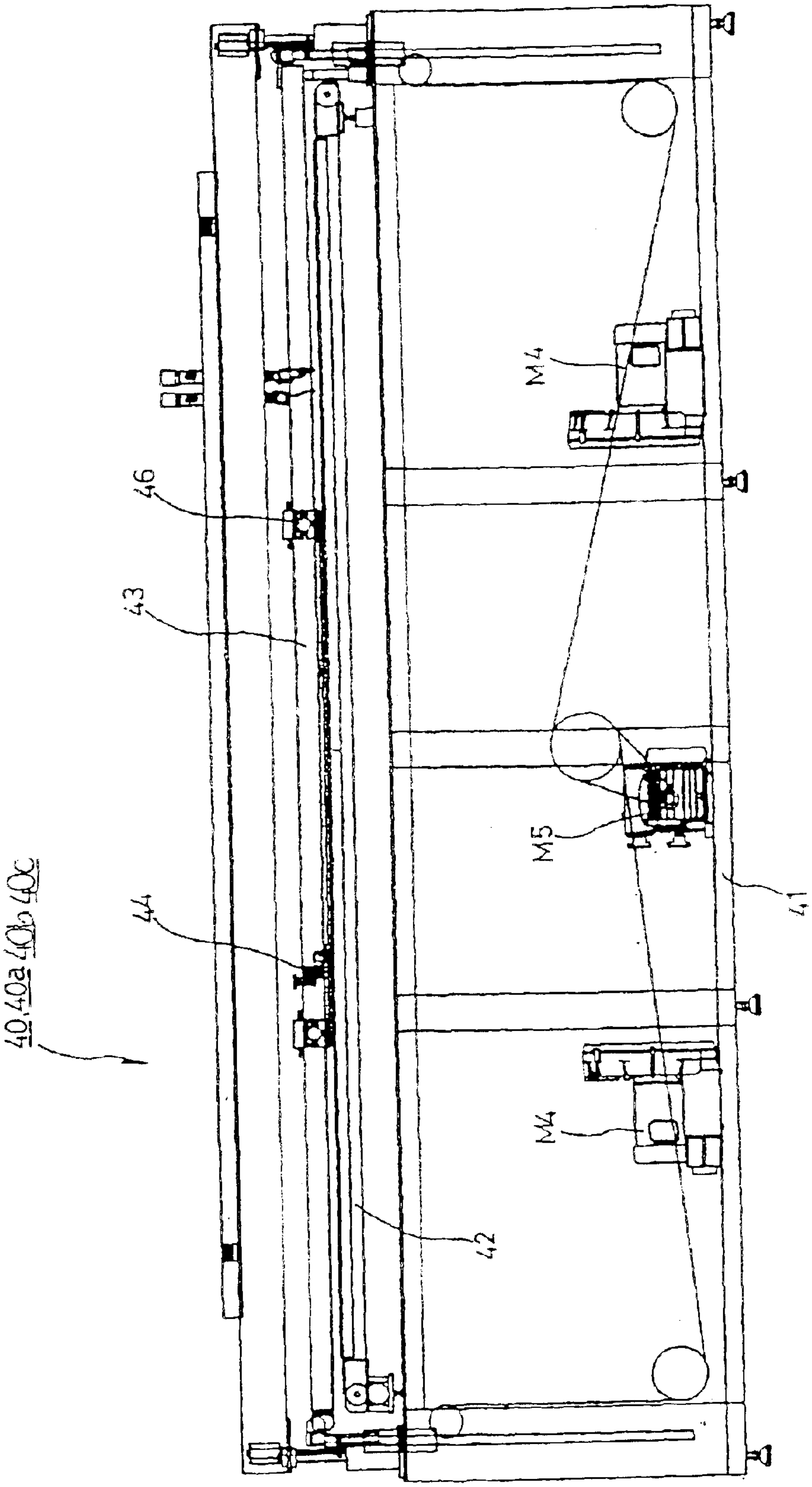
FIG. 5A is a front view roughly showing the first, second, third and fourth printing means selected according to the present invention.
Figure 5B:
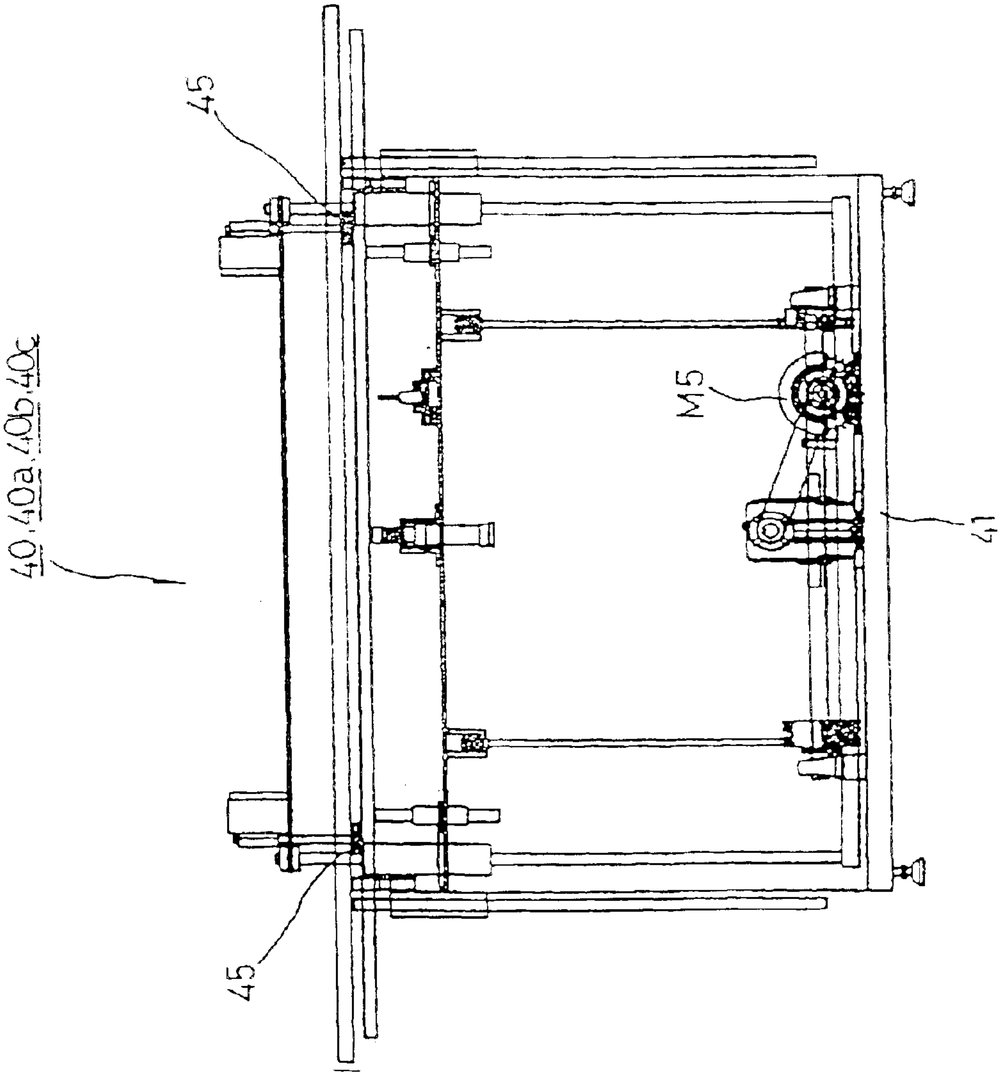
FIG. 5B is a side view roughly showing the first, second, third and fourth printing means selected according to the present invention.

The 1st printing means(40) is connected to the linear side of the 1st arranging means(30) configured as above so as to form a coaxial line with the 1st arranging means(30). FIGS. 5A and 5B are a front view and a plan view, respectively, roughly showing the 1st printing means(40) selected according to the present invention. As shown in FIGS. 5A and 5B, a workbench(42) is installed on a frame(41) so as to be level with the supplying rollers(32) of the 1st arranging means (30), so that materials to be supplied from the 1st arranging means are admitted properly. A discharging member(45), movable right and left by a driving motor(M4), is installed in both sides of the workbench(42). A squeegee(44), movable back and forth by a screen fixing member(46) and a driving motor(M5), is mounted on a screen frame(43) installed on the top of the workbench(42) so as to be liftable. A screen having mesh points formed in the shape of a desired design is attached to the bottom of the screen fixing member(46).

Figure 6A:
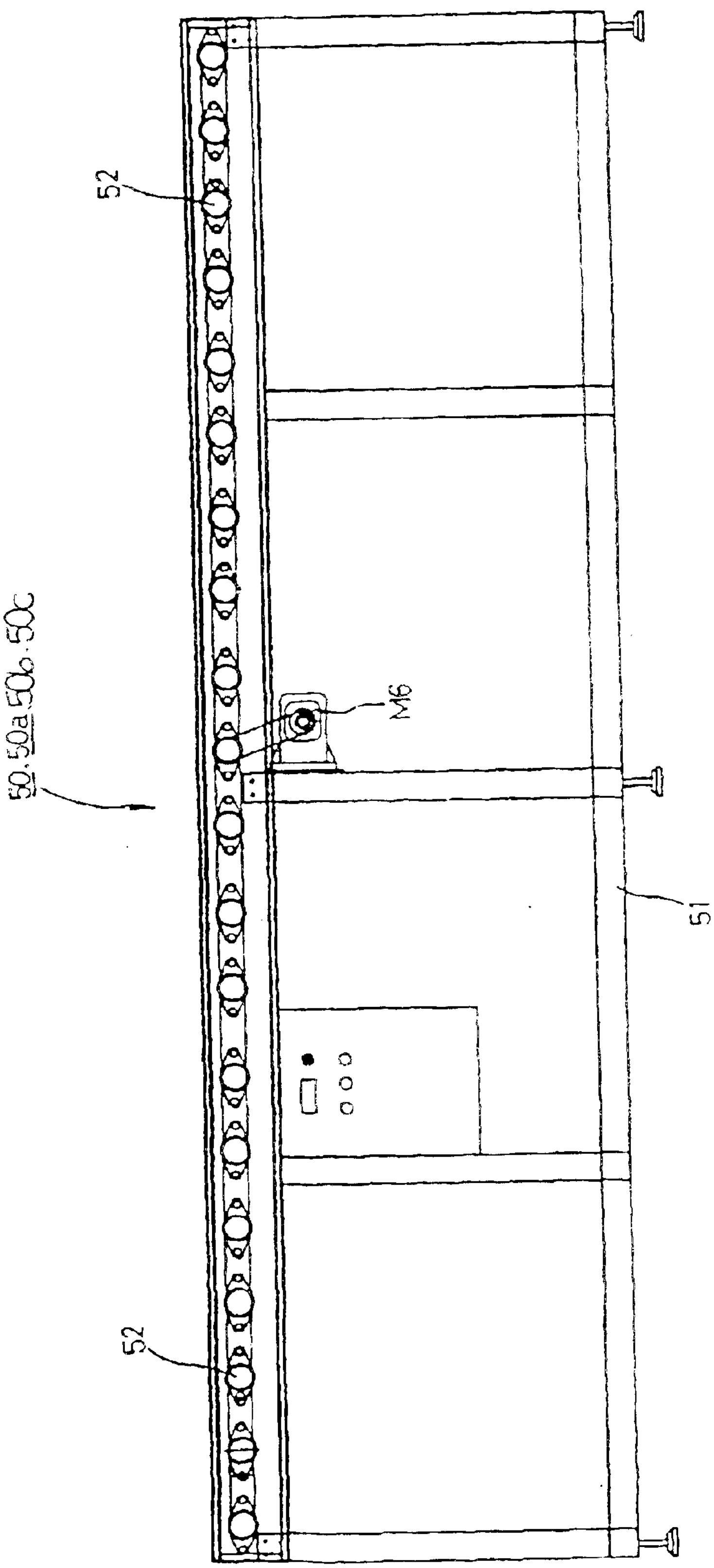
FIG. 6A is a front view roughly showing the first, second, third and fourth feeding means selected according to the present invention.
Figure 63:
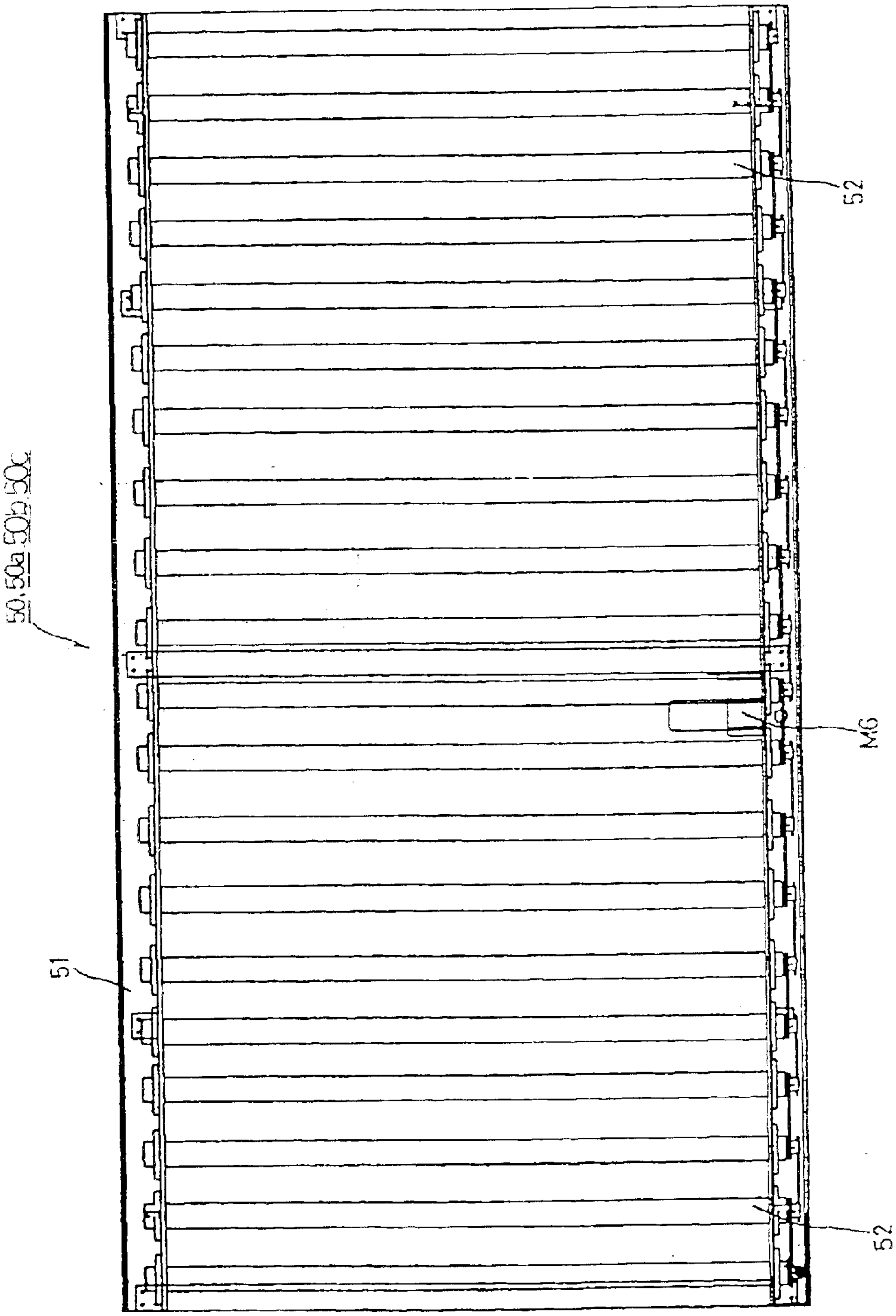

The 1st feeding means(50) is connected to the linear side of the 1st printing means(40) configured as above so as to form a coaxial line with the 1st printing means(40). FIGS. 6A and 6B are a front view and a plan view, respectively, roughly showing the 1st feeding means(50) selected according to the present invention. As shown in FIGS. 6A and 6B, the 1st feeding means(50) has a plurality of feeding rollers (52) installed axially on a frame(51) so as to be driven by means such as a driving motor(M6) and belts fitted together but to be level with the workbench(42) of the 1st printing means(40) so that materials that went through the printing process can be fed smoothly to the 1st feeding means(50).

Figure 7A:
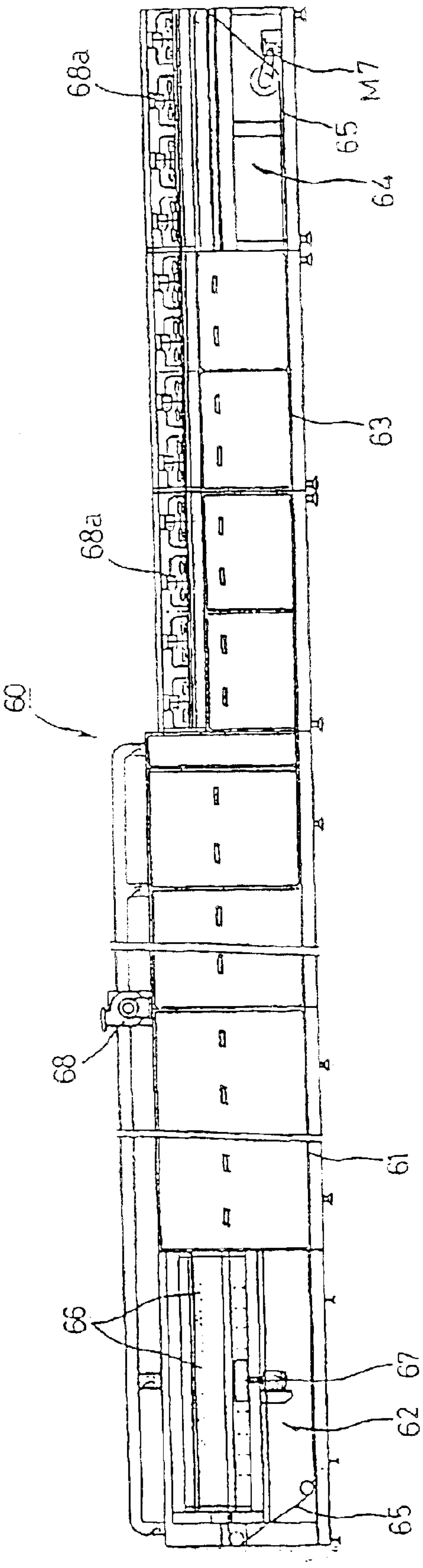
FIG. 7A is a front view roughly showing the first drying and cooling means selected according to the present invention.
Figure 7B:
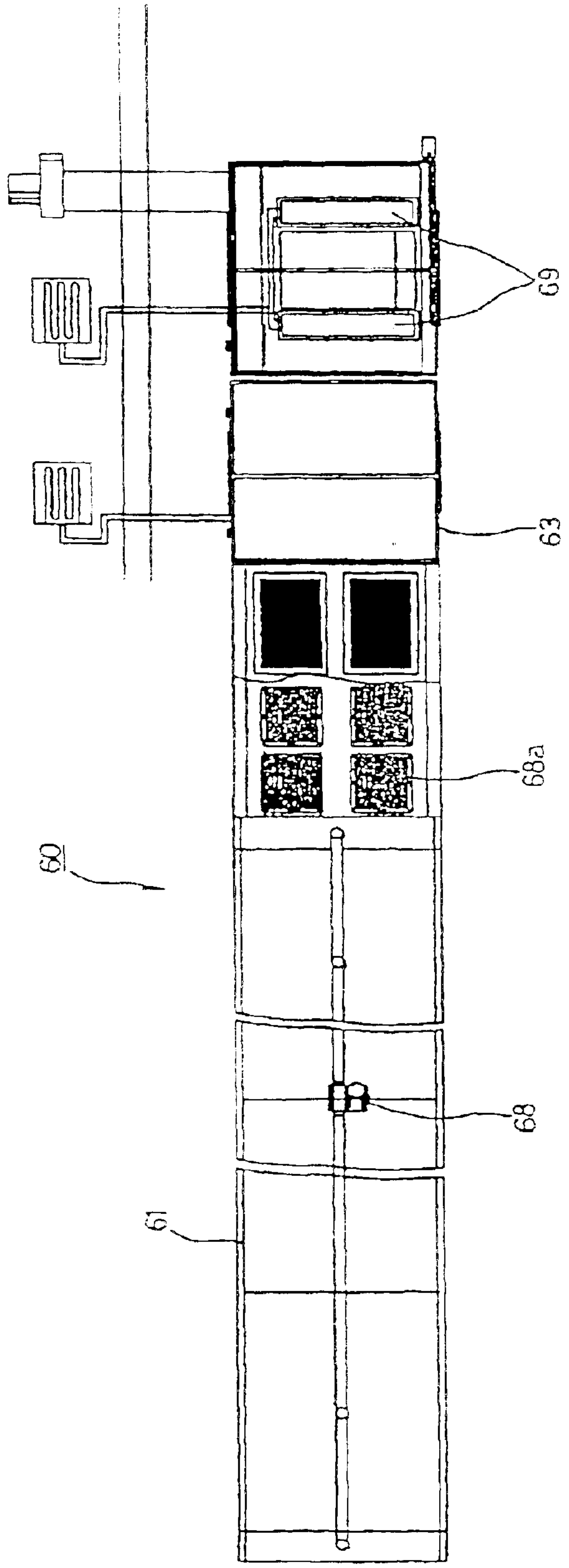
FIG. 7B is a plan view roughly showing the first drying and cooling means selected according to the present invention.

The 1st drying & cooling means(60) is connected to the linear side of the 1st feeding means(50) configured as above so as to form a coaxial line with the 1st feeding means(50). FIGS. 7A and 7B are a front view and a plan view, respectively, roughly showing the 1st drying and cooling means(60) selected according to the present invention As shown in FIGS. 7A and 7B, the 1st drying and cooling means(60) is largely divided into two chambers a drying chamber(62) and a cooling chamber(64) which are enclosed by a drying casing(61) and a cooling casing(63), respectively. A feeding belt, driven by a driving motor(M7), is installed across the drying chamber(62) and cooling casing (64) within the 1st drying & cooling means(60) so as to be level with the feeding roller provided by the 1st feeding means(50) so that materials fed from the 1st feeding means (50) are smoothly fed to the feeding belt(65) of the 1st drying & cooling means(60). A plural row of I.R heaters(69) and a few blast fans(67) are installed inside of the drying chamber(62), whereas a plural row of coolers(64) are installed inside of the drying chamber. A discharge fan(68) is installed outside of the drying chamber(62) for forcedly discharging internal air, and a cooling fan(68*a*) is installed on the top of the cooling chamber(64).

The 2nd arranging means(30*a*) is connected to the linear side of the 1st drying & cooling means(60) configured as above so as to form a coaxial line with the 1st drying & cooling means(60). FIGS. 4A and 4B are a front view and a plan view, respectively, roughly showing the 2nd arranging means(30*a*) selected according to the present invention. As shown in FIGS. 4A and FIG. 4B, a plurality of supplying rollers(32), which are driven by a driving motor(M3), are installed axially on a frame(31), so as to be level with the feeding belt(65) provided by the 1st drying and cooling means(60) so that materials fed from the 1st drying & cooling means(60) are smoothly fed to the supplying roller (32) of the 2nd arranging means(30*a*). A fixing pin(33) is mounted in one side of the 2nd arranging means(30*a*), and a positioning pin(35), expansible back and forth by a cylinder(34), is mounted on the other opposite side.

Figure 9A:
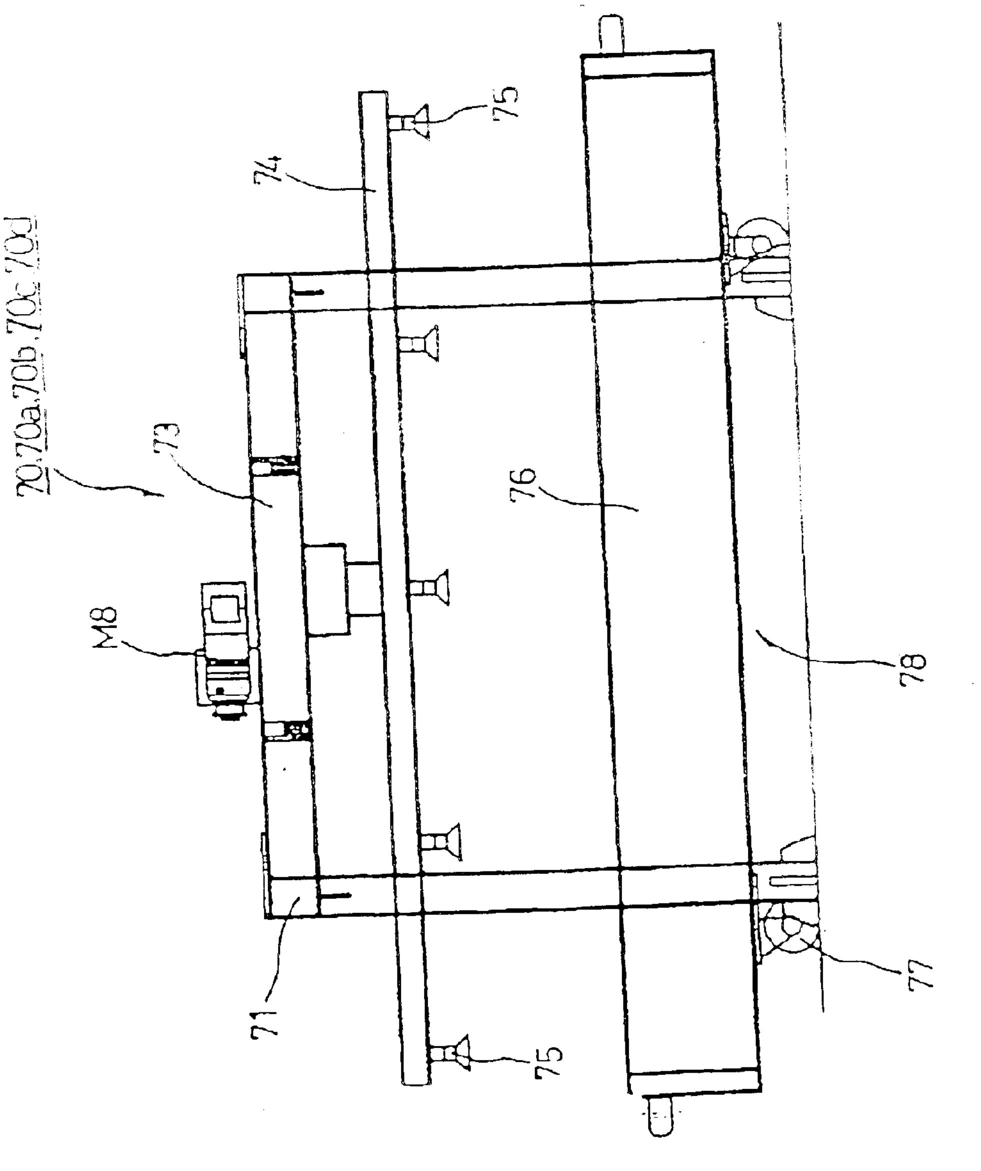
FIG. 9A is a front view roughly showing the first, second, third, fourth and fifth discharging means selected according to the present invention.
Figure 9B:
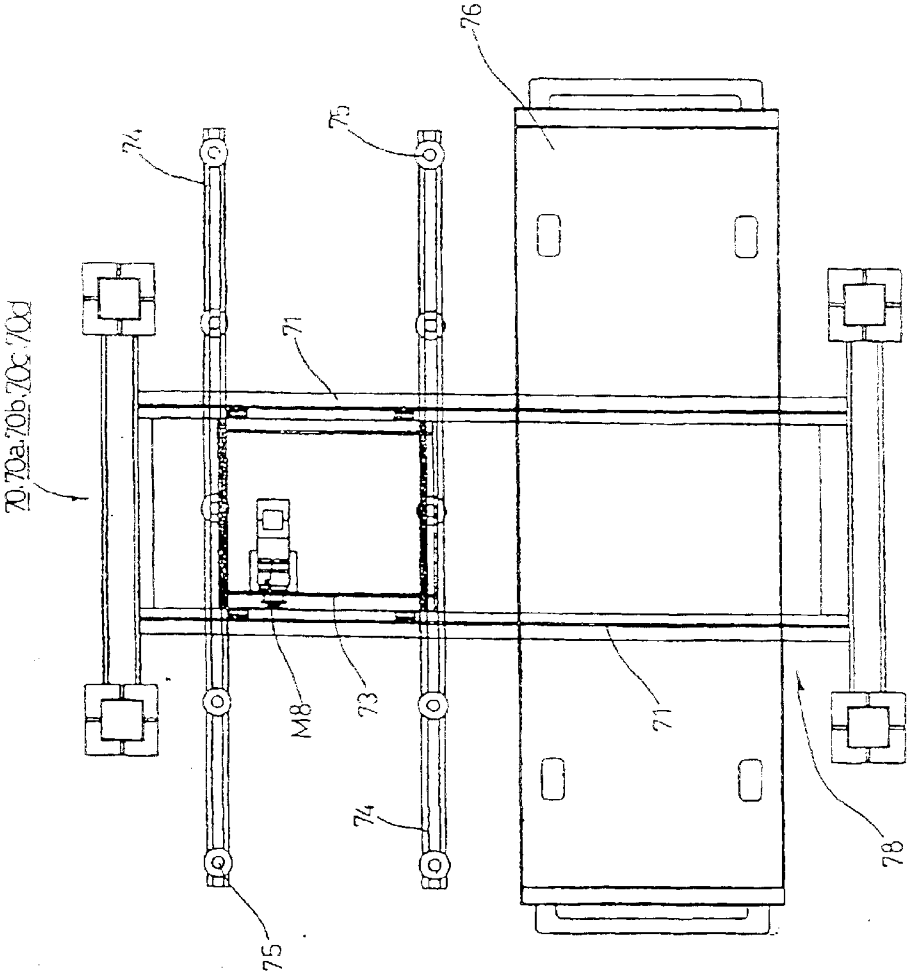
FIG. 9B is a plan view roughly showing the first, second, third, fourth and fifth discharging means selected according to the present invention.

The 1st discharging means(70) is connected to the 2nd arranging means(30*a*) configured as above so as to be perpendicularly across. FIGS. 9A and 9B are a front view and a plan view, respectively, roughly showing the 1st discharging means(70) selected according to the present invention As shown in FIGS. 9A and 9B, a discharging frame(71) is installed so as to be perpendicular across the 2nd arranging means(30*a*) so that a discharging area(78) is formed in the area of the one side of the discharging frame(71). A discharging cart(73), movable up and down from the top of the 2nd arranging means(30*a*) to the discharging area(78) by a driving motor(M8), is placed on the discharging frame(71), a liftable discharging arm(74) is installed on the discharging cart(73), an air pad(75) is mounted at the bottom of the discharging arm(74) to carry materials, and a discharging magazine provided with a caster(77) is placed in the discharged area(78) so that materials discharged by the discharging arm(74) are collected.

The 2nd printing means(40*a*) is connected to the linear side of the 2nd arranging means(30*a*) configured as above so as to form a coaxial line with the 2nd arranging means(30*a*). FIGS. 5A and 5B are a front view and a plan view, respectively, roughly showing the 2nd printing means(40*a*) selected according to the present invention. As shown in FIGS. 5A and 5B, a workbench(42) is installed on a frame (41) so as to be level with the supplying rollers(32) of the 2nd arranging means(30*a*), so that materials to be supplied from the 2nd arranging means(30*a*) are admitted properly. A discharging member(45), movable right and left by a driving motor(M4), is installed in both sides of the workbench(42). A squeegee(44), movable back and forth by a screen fixing member(46) and a driving motor(M5), is mounted on a screen frame(43) installed on the top of the workbench(42) so as to be liftable. A screen having mesh points formed in the shape of a desired design is attached to the bottom of the screen fixing member(46).

The 2nd feeding means(50*a*) is connected to the linear side of the 2nd printing means(40*a*) configured as above so as to form a coaxial line with the 2nd printing means(40*a*). FIGS. 6A and 6B are a front view and a plan view, respectively, roughly showing the 2nd feeding means(50*a*) selected according to the present invention. As shown in FIGS. 6A and 6B, the 2nd feeding means(50*a*) has a plurality of feeding rollers(52) installed axially on a frame (51) so as to be driven by means such as a driving rotor(M6) and belts fitted together but to be level with the workbench (42) of the 2nd printing means(40*a*) so that materials that went through the printing process can be fed smoothly to the 2nd feeding means(50*a*).

Figure 8A:
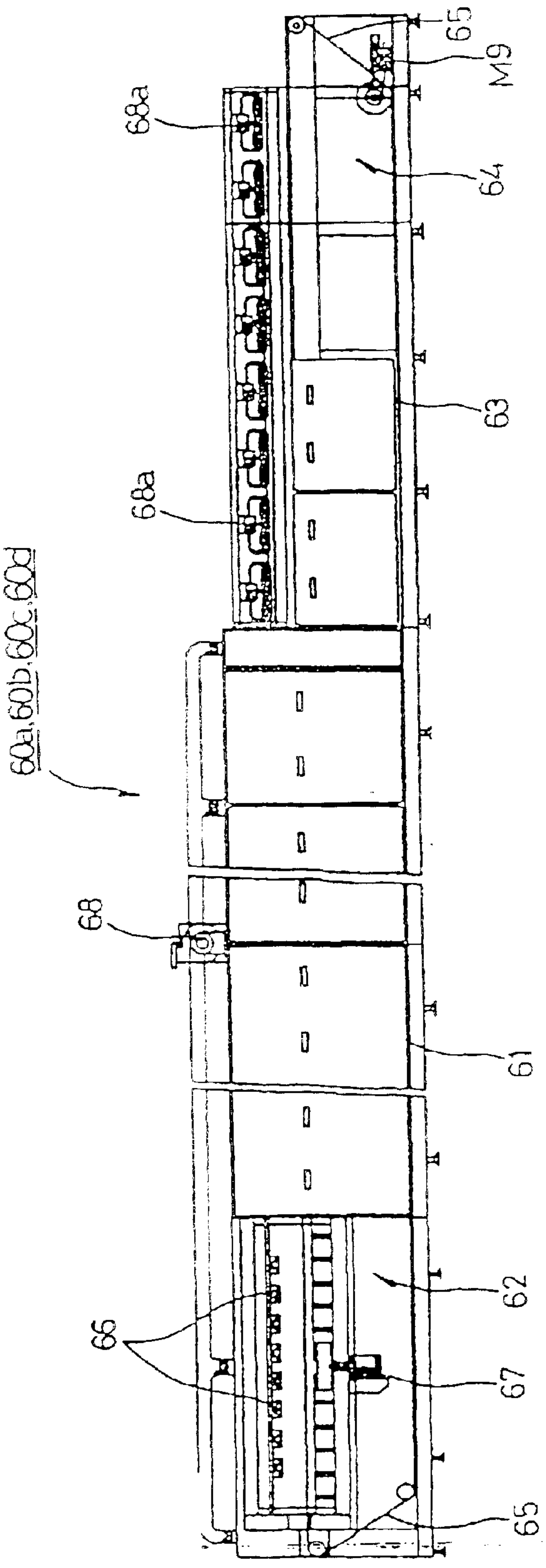
FIG. 8A is a front view roughly showing the second, third, fourth and fifth drying and cooling means selected according to the present invention.
Figure 8B:
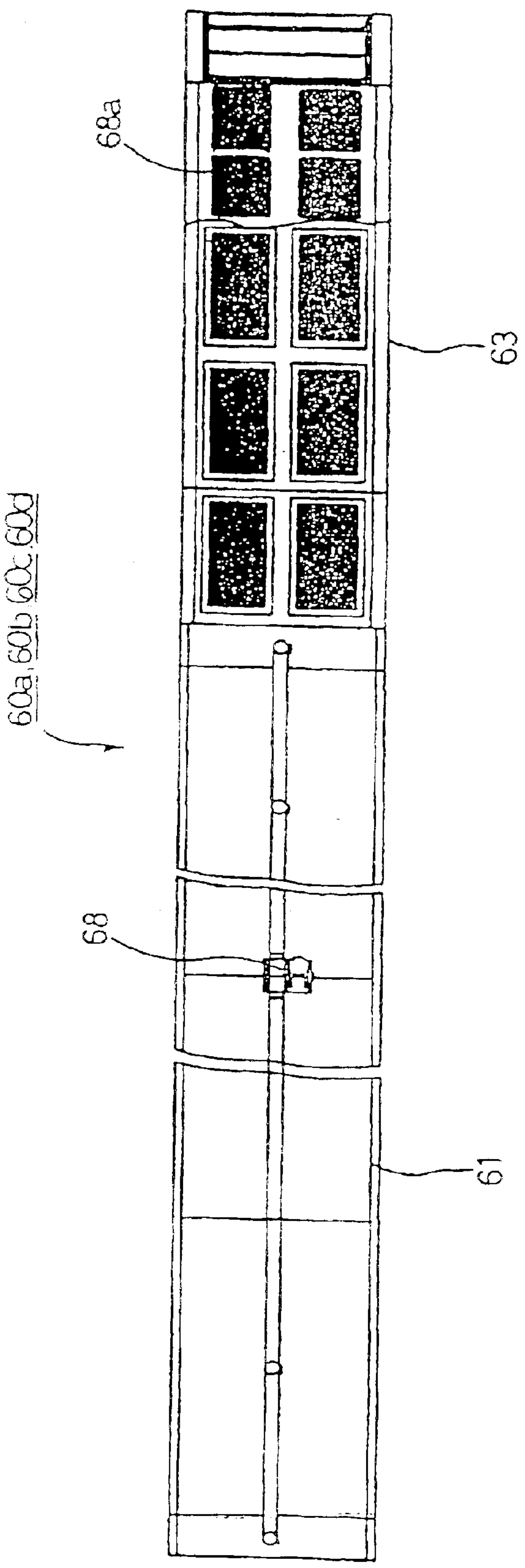
FIG. 8B is a plan view roughly showing the second, third, fourth and fifth drying and cooling means selected according to the present invention.

The 2nd drying & cooling means(60*a*) is connected to the linear side of the 2nd feeding means(50*a*) configured as above so as to form a coaxial line with the 2nd feeding means(50*a*). FIGS. 8A and 8B are a front view and a plan view, respectively, roughly showing the 2nd drying and cooling means(60*a*) selected according to the present invention. As shown in FIGS. 8A and 8B, the 2nd drying and cooling means(60*a*) is largely divided into two chambers—a drying chamber(62) and a cooling chamber(64) which are enclosed by a drying casing(61) and a cooling casing(63), respectively. A feeding belt, driven by a driving motor(M9), is installed across the drying chamber(62) and cooling casing(64) within the 2nd drying & cooling means(60*a*) so as to be level with the feeding roller provided by the 2nd feeding means(50*a*) so that materials fed from the 2nd feeding means(50*a*) are smoothly fed to the feeding belt(65) of the 2nd drying & cooling means(60*a*). A plural row of I.R heaters(66) and a few blast fans(67) are installed inside of the drying chamber(62), a discharge fan(68) is installed outside of the drying chamber(62) for forcedly discharging internal air, and a cooling fan(68*a*) is installed on the top of the cooling chamber(64).

The 3rd arranging means(30*b*) is connected to the linear side of the 2nd drying & cooling means(60*a*) configured as above so as to form a coaxial line with the 2nd drying & cooling means(60*a*). FIGS. 4A and 4B are a front view and a plan view, respectively, roughly showing the 3rd arranging means(30*b*) selected according to the present invention. As shown in FIGS. 4A and 4B, a plurality of supplying rollers (32), which are driven by a driving motor(M3), are installed axially on a frame(31), so as to be level with the feeding belt(65) provided by the 2nd drying and cooling means(60*a*) so that materials fed from the 2nd drying & cooling means (60*a*) are smoothly fed to the supplying roller(32) of the 3rd arranging means(30*b*). A fixing pin(33) is mounted in one side of the 3rd arranging means(30*b*), and a positioning pin(35), expansible back and forth by a cylinder(34), is mounted on the other opposite side.

The 2nd discharging means(70*a*) is connected to the 3rd arranging means(30*b*) configured as above so as to be perpendicularly across. FIGS. 9A and 9B are a front view and a plan view, respectively, roughly showing the 2nd discharging means(70*a*) selected according to the present invention. As shown in FIGS. 9A and 9B, a discharging frame(71) is installed so as to be perpendicular across the 3rd arranging means(30*b*) so that a discharging area(78) is formed in the area of the one side of the discharging frame(71). A discharging cart(73), movable up and down from the top of the 3rd arranging means(30*b*) to the discharging area(78) by a driving motor(M8), is placed on the discharging frame(71), a liftable discharging arm(74) is installed on the discharging cart(73), an air pad(75) is mounted at the bottom of the discharging arm(74) to carry materials, and a discharging magazine provided with a caster(77) is placed in the discharged area(78) so that materials discharged by the discharging arm(74) are collected.

The 3rd printing means(40*b*) is connected to the linear side of the 3rd arranging means(30*b*) configured as above so as to form a coaxial line with the 3rd arranging means(30*b*). FIGS. SA and 5B are a front view and a plan view, respectively, roughly showing the 3rd printing means(40*b*) selected according to the present invention. As shown in FIGS. 5A and 5B, a workbench(42) is installed on a frame (41) so as to be level with the supplying rollers(32) of the 3rd arranging means(30*b*) so that materials to be supplied from the 3rd arranging means(30*b*) are admitted properly. A discharging member(45), movable right and left by a driving motor(M4), is installed in both sides of the workbench(42). A squeegee(44), movable back and forth by a screen fixing member(46) and a driving motor(M5), is mounted on a screen frame(43) installed on the top of the workbench(42) so as to be liftable. A screen having mesh points formed in the shape of a desired design is attached to the bottom of the screen fixing member(46).

The 3rd feeding means(50*b*) is connected to the linear side of the 3rd printing means(40*b*) configured as above so as to form a coaxial line with the 3rd printing means(40*b*). FIGS. 6A and 6B are a front view and a plan view, respectively, roughly showing the 3rd feeding means(50*b*) selected according to the present invention. As shown in FIGS. 6A and 6B, the 3rd feeding means(50*b*) has a plurality of feeding rollers(52) installed axially on a frame(51) so as to be driven by means such as a driving motor(M6) and belts fitted together but to be level with the workbench(42) of the 3rd printing means(40*b*) so that materials that went through the printing process can be fed smoothly to the 3rd feeding means(50*b*).

The 3rd drying & cooling means(60*b*) is connected to the linear side of the 3rd feeding means(50*b*) configured as above so as to form a coaxial line with the 3rd feeding means(50*b*). FIGS. 8A and 8B are a front view and a plan view, respectively, roughly showing the 3rd drying and cooling means(60*b*) selected according to the present invention. As shown in FIGS. 8A and 8B, the 3rd drying and cooling means(60*b*) is largely divided into two chambers—a drying chamber(62) and a cooling chamber(64) which are enclosed by a drying casing(61) and a cooling casing(63), respectively. A feeding belt, driven by a driving motor(M9), is installed across the drying chamber(62) and cooling casing(64) within the 3rd drying & cooling means(60*b*) so as to be level with the feeding roller provided by the 3rd feeding means(50*b*) so that materials fed from the 3rd feeding means(50*b*) are smoothly fed to the feeding belt(65) of the 3rd drying & cooling means(60*b*). A plural row of I.R heaters(69) and a few blast fans(67) are installed inside of the drying chamber(62), whereas a plural row of coolers(64) are installed inside of the drying chamber. A discharge fan(68) is installed outside of the drying chamber(62) for forcedly discharging internal air, and a cooling fan(68*a*) is installed on the top of the cooling chamber(64).

The 4th arranging means(30*c*) is connected to the linear side of the 3rd drying & cooling means(60*b*) configured as above so as to form a coaxial line with the 3rd drying & cooling means(60*b*). FIGS. 4A and 4B are a front view and a plan view, respectively, roughly showing the 4th arranging means(30*c*) selected according to the present invention. As shown in FIGS. 4A and 4B, a plurality of supplying rollers (32), which are driven by a driving motor(M3), are installed axially on a frame(31), so as to be level with the feeding belt(65) provided by the 3rd drying and cooling means(60*b*) so that materials fed from the 3rd drying & cooling means (60*b*) are smoothly fed to the supplying roller(32) of the 4th arranging means(30*c*). A fixing pin(33) is mounted in one side of the 4th arranging means(30*c*), and a positioning pin(35), expansible back and forth by a cylinder(34), is mounted on the other opposite side.

The 3rd discharging means(70*b*) is connected to the 4th arranging means(30*c*) configured as above so as to be perpendicularly across. FIGS. 9A and 9B are a front view and a plan view, respectively, roughly showing the 3rd discharging means(70*b*) selected according to the present invention. As shown in FIGS. 9A and 9B, a discharging frame(71) is installed so as to be perpendicular across the 4th arranging means(30*c*) so that a discharging area(78) is formed in the area of the one side of the discharging frame(71). A discharging cart(73), movable up and down from the top of the 4th arranging means(30*c*) to the discharging area(78) by a driving motor(M8), is placed on the discharging frame(71), a liftable discharging arm(74) is installed on the discharging cart(73), an air pad(75) is mounted at the bottom of the discharging arm(74) to carry materials, and a discharging magazine provided with a caster(77) is placed in the discharged area(78) so that materials discharged by the discharging arm(74) are collected.

The 4th printing means(40*c*) is connected to the linear side of the 4th arranging means(30*c*) configured as above so as to form a coaxial line with the 4th arranging means(30*c*). FIGS. 5A and 5B are a front view and a plan view, respectively, roughly showing the 4th printing means(40*c*) selected according to the present invention. As shown in FIGS. 5A and 5B, a workbench(42) is installed on a frame (41) so as to be level with the supplying rollers(32) of the 4th arranging means(30*c*), so that materials to be supplied from the 4th arranging means(30*c*) are admitted properly. A discharging member(45), movable right and left by a driving motor(M4), is installed in both sides of the workbench(42). A squeegee(44), movable back and forth by a screen fixing member(46) and a driving motor(MS), is mounted on a screen frame(43) installed on the top of the workbench(42) so as to be liftable. A screen having mesh points formed in the shape of a desired design is attached to the bottom of the screen fixing member(46).

The 4th feeding means(50*c*) is connected to the linear side of the 4th printing means(40*c*) configured as above so as to form a coaxial line with the 4th printing means(40*c*). FIGS. 6A and 6B are a front view and a plan view, respectively, roughly showing the 5th feeding means(50*c*) selected according to the present invention. As shown in FIGS. 6A and 6B, the 4th feeding means(50*c*) has a plurality of feeding rollers(52) installed axially on a frame(51) so as to be driven by means such as a driving motor(M6) and belts fitted together but to be level with the workbench(42) of the 4th printing means(40*c*) so that materials that went through the printing process can be fed smoothly to the 4th feeding means(50*c*).

The 4th drying & cooling means(60*c*) is connected to the linear side of the 4th feeding means(50*c*) configured as above so as to form a coaxial line with the 4th feeding means(50*c*). FIGS. 8A and 8B are a front view and a plan view, respectively, roughly showing the 4th drying and cooling means(60*c*) selected according to the present invention As shown in FIGS. 8A and 8B, the 4th drying and cooling means(60*c*) is largely divided into two chambers—a drying chamber(62) and a cooling chamber(64) which are enclosed by a drying casing(61) and a cooling casing(63), respectively. A feeding belt, driven by a driving motor(M9), is installed across the drying chamber(62) and cooling casing(64) within the 4th drying & cooling means(60*c*) so as to be level with the feeding roller(52) provided by the 4th feeding means(50*c*) so that materials fed from the 4th feeding means(50*c*) are smoothly fed to the feeding belt(65) of the 4th drying & cooling means(60*c*). A plural row of I.R heaters(66) and a few blast fans(67) are installed inside of the drying chamber(62), a discharge fan(68) is installed outside of the drying chamber(62) for forcedly discharging internal air, and a cooling fan(68*a*) is installed on the top of the cooling chamber(64).

The 5th arranging means(30*d*) is connected to the linear side of the 4th drying & cooling means(60*c*) configured as above so as to form a coaxial line with the 4th drying & cooling means(60*c*). FIGS. 4A and 4B are a front view and a plan view, respectively, roughly showing the 5th arranging means(30*d*) selected according to the present invention. As shown in FIGS. 4A and 4B, a plurality of supplying rollers (32), which are driven by a driving motor(M3), are installed axially on a frame(31), so as to be level with the feeding belt(65) provided by the 4th drying and cooling means(60*c*) so that materials fed from the 4th drying & cooling means (60*c*) are smoothly fed to the supplying roller(32) of the 5th arranging means(30*d*). A fixing pin(33) is mounted in one side of the 5th arranging means(30*d*), and a positioning pin(35), expansible back and forth by a cylinder(34), is mounted on the other opposite side.

The 4th discharging means(70*c*) is connected to the 5th arranging means(30*d*) configured as above so as to be perpendicularly across. FIGS. 9A and 9B are a front view and a plan view, respectively, roughly showing the 4th discharging means(70*c*) selected according to the present invention. As shown in FIGS. 9A and 9B, a discharging frame(71) is installed so as to be perpendicular across the 5th arranging means(30*d*) so that a discharging area(78) is formed in the area of the one side of the discharging frame(71). A discharging cart(73), movable up and down from the top of the 5th arranging means(30*d*) to the discharging area(78) by a driving motor(M8), is placed on the discharging frame(71), a liftable discharging arm(74) is installed on the discharging cart(73), an air pad(75) is mounted at the bottom of the discharging arm(74) to carry materials, and a discharging magazine provided with a caster(77) is placed in the discharged area(78) so that materials discharged by the discharging arm(74) are collected.

Figure 10:
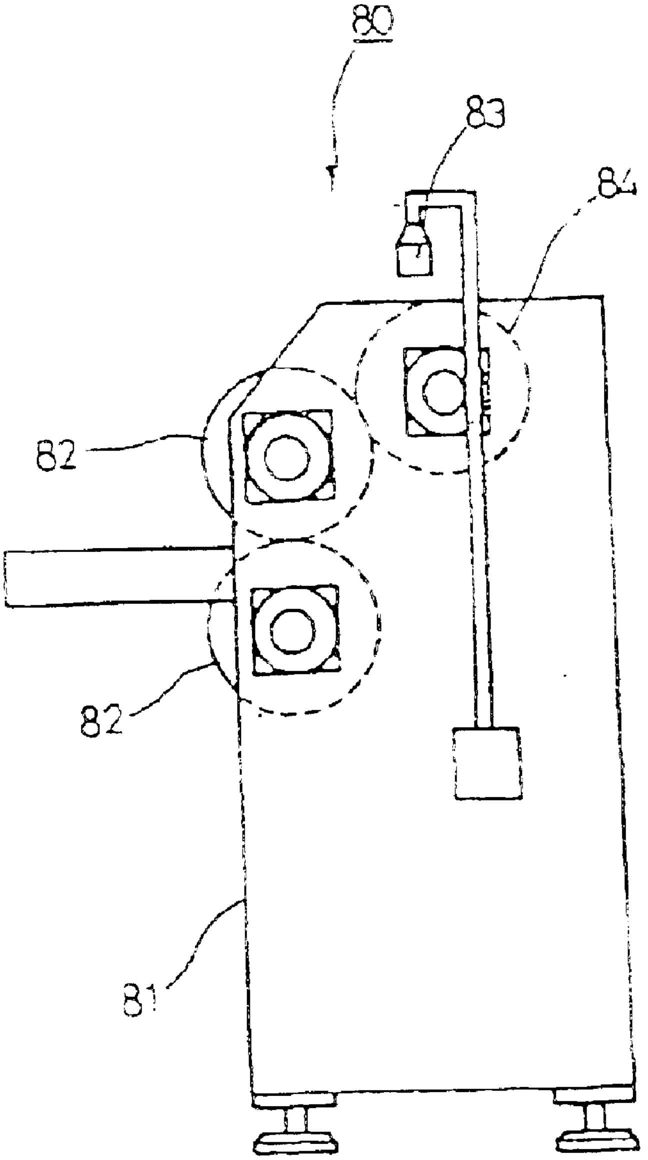
FIG. 10 is a front view roughly showing the coating means selected according to the present invention.

The coating means(80) is connected to the linear side of the 5th arranging means(30*d*) configured as above. FIG. 10 is a front view roughly showing the coating means selected according to the present invention. As shown in FIG. 10, Feeding rollers(82) are installed axially on a frame so as to be driven by a driving motor(not illustrated). A clearance formed between the upper and lower feeding rollers(82) must be level with the top surface of the supplying roller(32) provided by the 5th arranging means(30*d*) so that materials fed from, the 5th arranging means(30*d*) are admitted smoothly between the feeding rollers(82). Supplying rollers (84) are installed axially so as to be connected with the feeding rollers(82) so that the paste is supplied to the feeding rollers(82). The coating means(80) is provided with a supply nozzle(83) for supplying the paste as coating material to the supplying rollers(84).

Figure 11A:
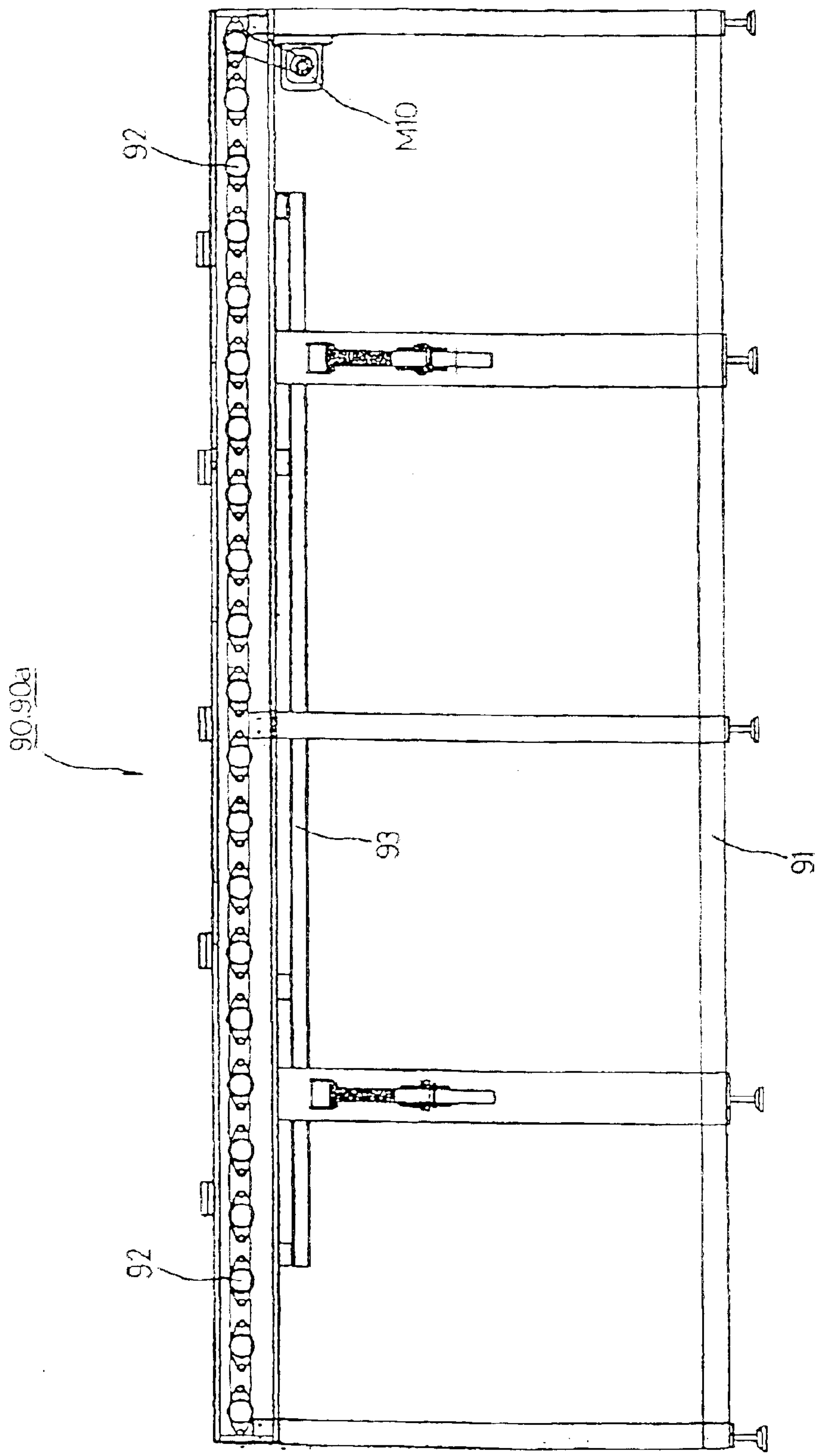
FIG. 11A is a front view roughly showing the first, second and third turning means selected according to the present invention.
Figure 11B:
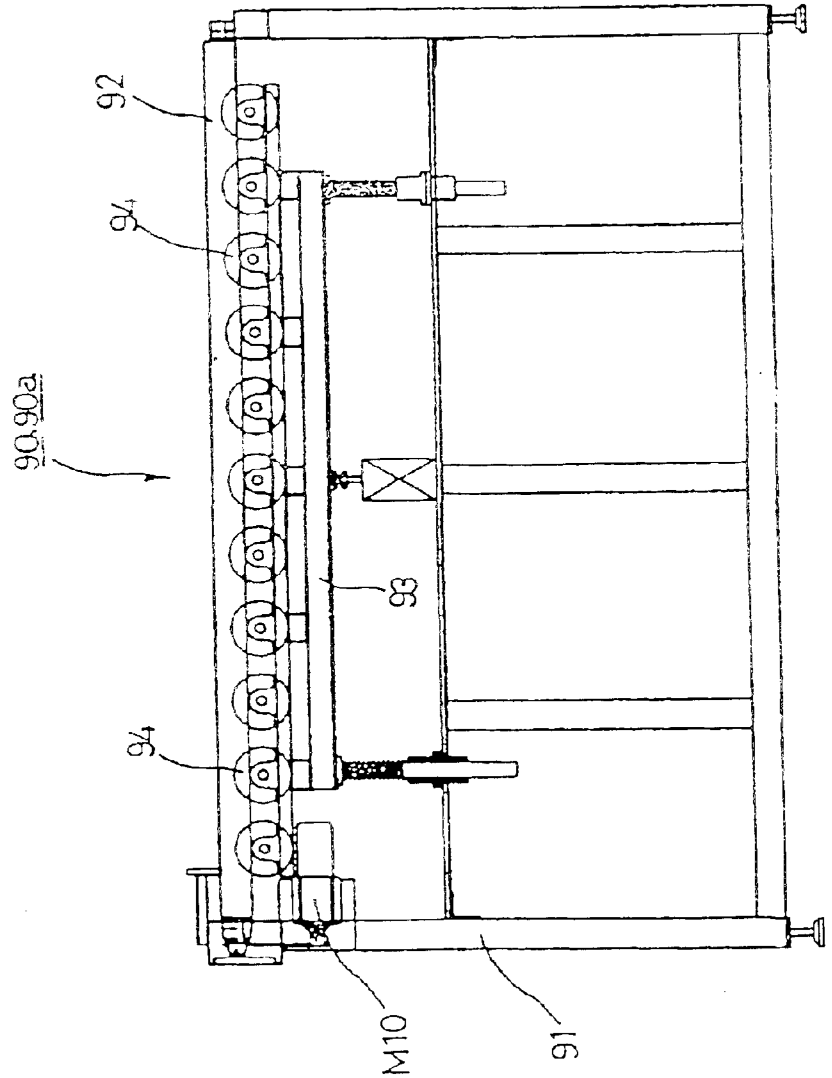
FIG. 11B is a side view roughly showing the first, second and third turning means selected according to the present invention.

The 1st turning means(90) is connected to the linear side of the coating means(80) configured as above so as to form a coaxial line with the coating means(80). FIGS. 11A and 11B are a front view and a plan view, respectively, roughly showing the 1st turning means(90) selected according to the present invention. As shown in FIGS. 11A and 11B, a plurality of feeding rollers(92) intended to accept the width and overall length of material in a uniform position are installed axially on a frame, which is driven by a driving motor(10). The feeding rollers(92) must be level with a clearance formed between the feeding rollers(82) provided by the coating means(80) so that materials coated through the coating means(80) are fed smoothly to the feeding rollers(92). A plurality of quick feeding rollers(94) to be located between the feeding rollers(92) are installed axially on a quick feeding plate(93) so as to rotate in a direction perpendicular to the rotating direction of the feeding rollers (92) so that the quick feeding rollers(94) can be lifted by the quick feeding plate(93).

Figure 12:
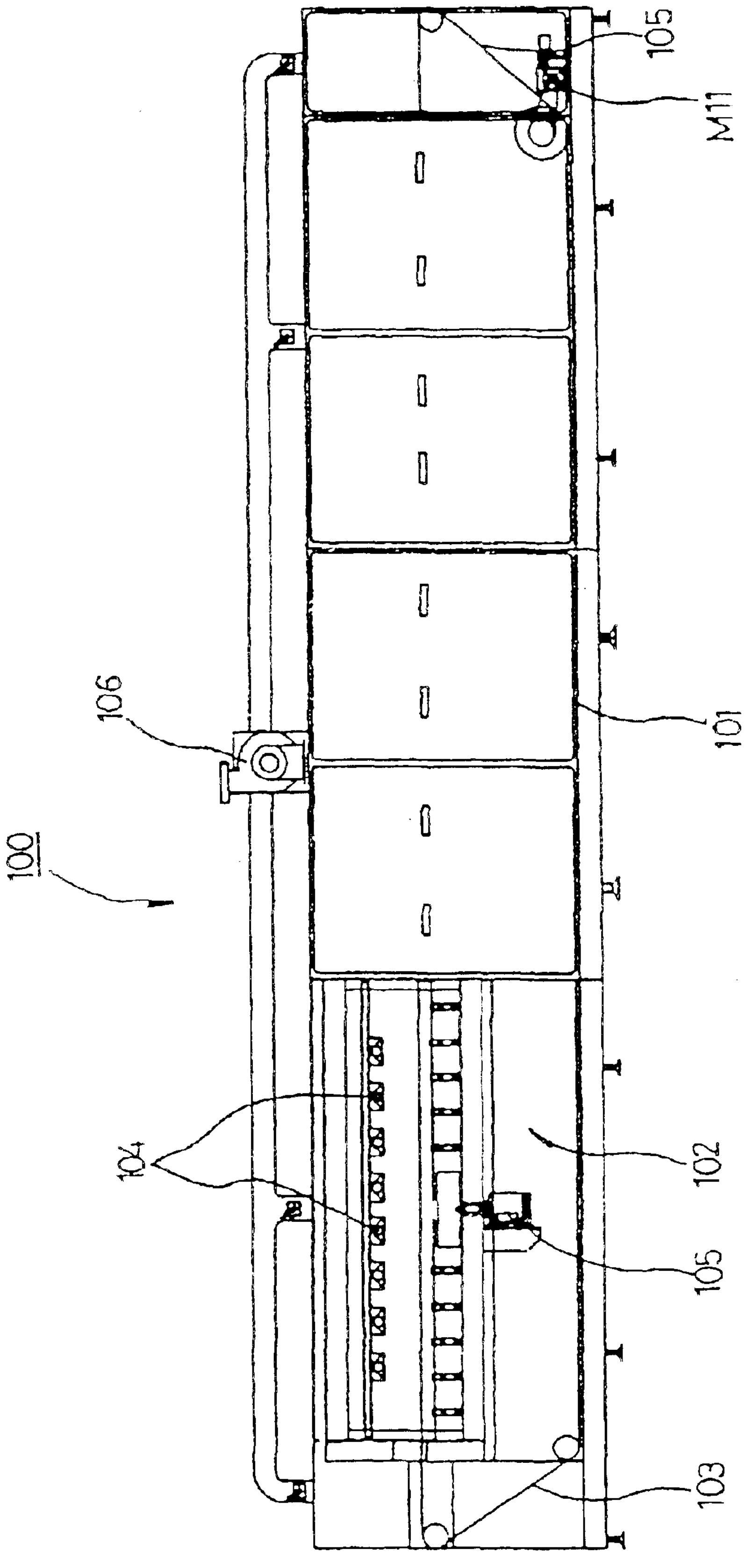
FIG. 12 is a front view roughly showing the drying means selected according to the present invention.

The drying means(100) is connected to the linear side perpendicularly across the 1st turning means(90) configured as above. FIG. 12 is a front view roughly showing the drying means(100) selected according to the present invention. The drying means(100) is provided with a drying chamber(102) enclosed by a casing(101). A feeding belt(103), driven by a driving motor(M11), is installed within the drying chamber so as to be level with the quick feeding rollers(94) provided by the 1st turning means(90) so that materials fed from the 1st turning means(90) are loaded smoothly on the feeding belt(103). A plural row of I.R heaters(104) are installed over the feeding belt(103), a few blast fans(105S) are installed inside of the drying chamber(102) and a discharge fan(106) is mounted outside of the casing(101) for forcedly discharging internal air.

The 2nd turning means(90*a*) is connected to the linear side perpendicularly across the drying means(100) configured as above. FIGS. 11A and 11B are a front view and a plan view, respectively, roughly showing the 2nd turning means(90*a*) selected according to the present invention. As shown in FIGS. 11A and 11B, a plurality of feeding rollers (92) intended to accept the width and overall length of material in a uniform position are installed axially on a frame, which is driven by a driving motor(10). A plurality of quick feeding rollers(94) to be located between the feeding rollers(92) are installed axially on a quick feeding plate(93) so as to rotate in a direction perpendicular to the rotating direction of the feeding rollers(92) so that the quick feeding rollers(94) can be lifted by the quick feeding plate(93).

Figure 13:
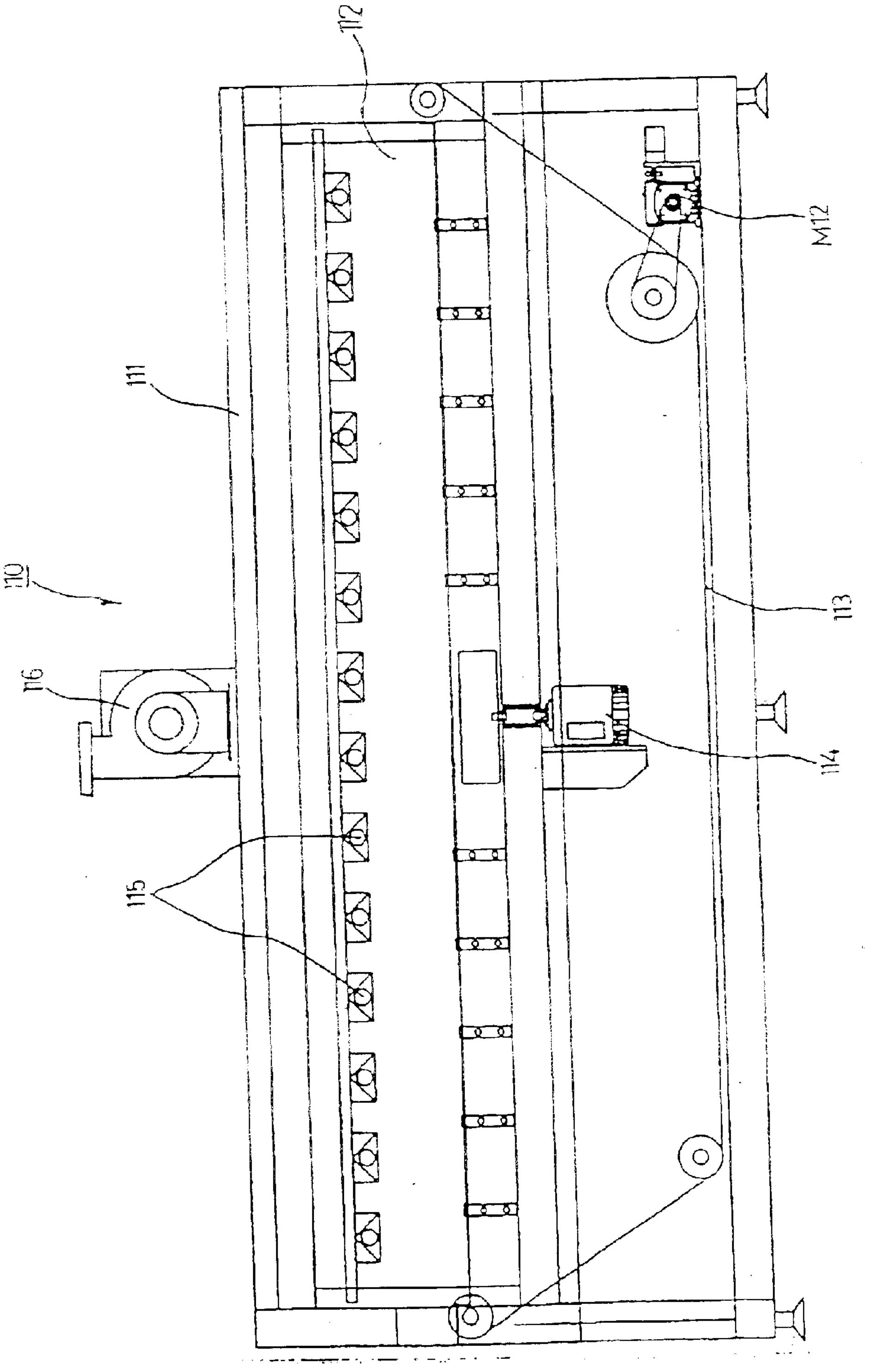
FIG. 13 is a front cross-sectional view roughly showing the preliminary drying means selected according to the present invention.

The preliminary drying means(110) is connected to the linear side of the 2nd turning means(90*a*) configured as above so as to form a coaxial line with the 2nd turning means(90*a*). FIG. 13 is a front view roughly showing the preliminary drying means(110) selected according to the present invention. As shown in FIG. 13, a feeding belt(113), driven by a driving motor(M12), is installed within a drying chamber(112) enclosed by a casing(111) so as to be level with the quick feeding rollers(94) provided by the 2nd turning means(90*a*) so that materials fed from the 2nd turning means(90*a*) are loaded smoothly on the feeding belt(113). A plural row of I.R heaters(115) and a few blast fans(114) are installed within the drying chamber(112) on the top of which a discharge fan(116) is mounted for forcedly discharging internal air.

Figure 14:
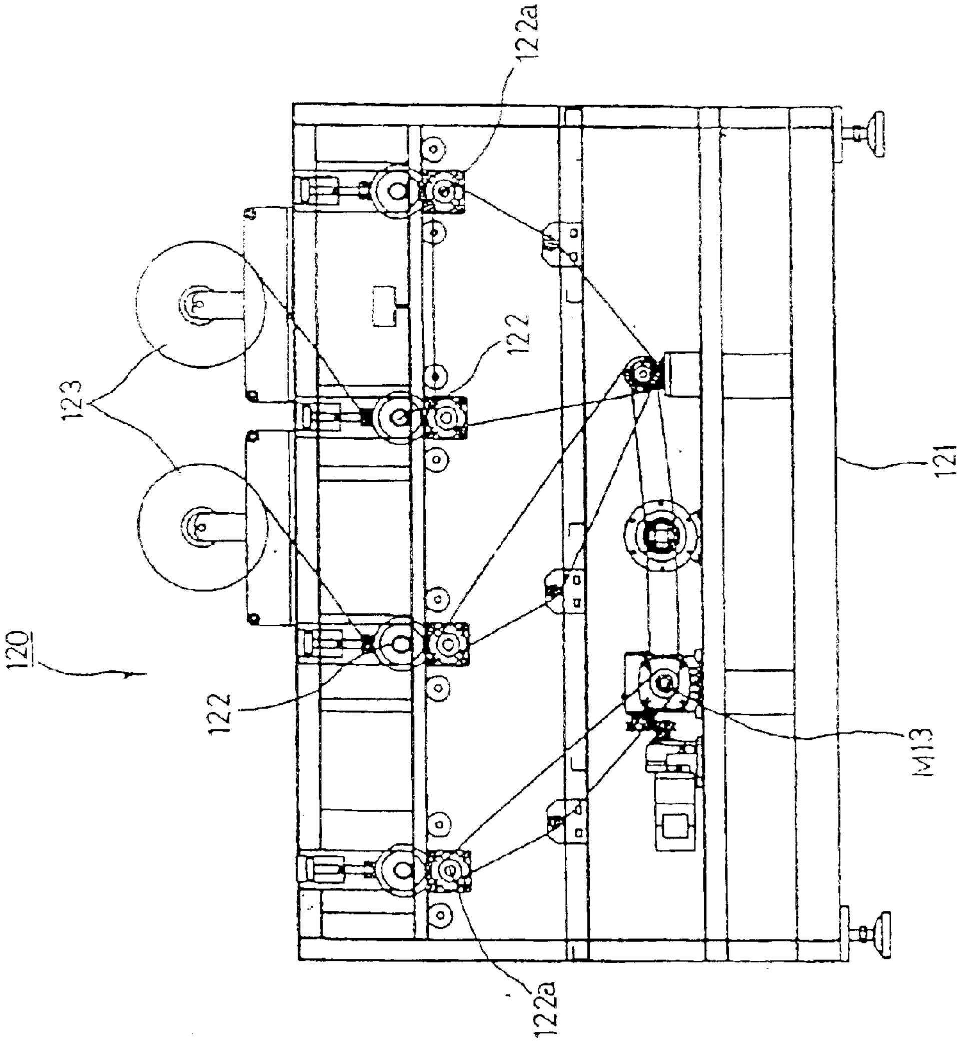
FIG. 14 is a front view roughly showing the laminating means selected according to the present invention.

The 5th drying & cooling means(60*d*) is connected to the linear side of the preliminary drying means(110) configured as above so as to form a coaxial line with the preliminary drying means(110). FIGS. 13 and 14 are a front view and a plan view, respectively, roughly showing the 5th drying and cooling means(60*d*) selected according to the present invention. As shown in FIGS. 8A and 8B, the 5th drying and cooling means(60*d*) is largely divided into two chambers—a drying chamber(62) and a cooling chamber(64) which are enclosed by a drying casing(61) and a cooling casing(63), respectively. A feeding belt, driven by a driving motor(M9), is installed across the drying chamber(62) and cooling casing(64) within the 5th drying & cooling means(60*d*) so as to be level with the feeding belt(113) provided by the preliminary drying means(110) so that materials fed from the preliminary drying means(110) are smoothly fed to the feeding belt(65) of the 5th drying & cooling means(60*d*). A plural row of I.R heaters(66) and a few blast fans(67) are installed inside of the drying chamber(62), a discharge fan(68) is installed outside of the drying chamber(62) for forcedly discharging internal air, and a cooling fan(68*a*) is installed on the top of the cooling chamber(64).

The 6th arranging means(30*e*) is connected to the linear side of the 5th drying & cooling means(60*d*) configured as above so as to form a coaxial line with the 5th drying & cooling means(60*d*). FIGS. 4A and 4B are a front view and a plan view, respectively, roughly showing the 6th arranging means(30*e*) selected according to the present invention. As shown in FIGS. 4A and 4B, a plurality of supplying rollers (32), which are driven by a driving motor(M3), are installed axially on a frame(31), so as to be level with the feeding belt(65) provided by the 5th drying and cooling means(60*d*) so that dried and coated materials are smoothly fed to the supplying roller(32). A fixing pin(33) is mounted in one side of the 6th arranging means(30*d*), and a positioning pin(35), expansible back and forth by a cylinder(34), is mounted on the other opposite side.

The 5th discharging means(70*d*) is connected to the 5th arranging means(30*d*) configured as above so as to be perpendicularly across. FIGS. 9A and 9B are a front view and a plan view, respectively, roughly showing the 5th discharging means(70*d*) selected according to the present invention. As shown in FIGS. 9A and 9B, a discharging frame(71) is installed so as to be perpendicular across the 6th arranging means(30*e*) so that a discharging area(78) is formed in the area of the one side of the discharging frame(71). A discharging cart(73), movable up and down from the top of the 6th arranging means(30*e*) to the discharging area(78) by a driving motor(M8), is placed on the discharging frame(71), a liftable discharging arm(74) is installed on the discharging cart(73), an air pad(75) is mounted at the bottom of the discharging arm(74) to carry materials, and a discharging magazine provided with a caster(77) is placed in the discharged area(78) so that materials discharged by the discharging arm(74) are collected.

The laminating means(120) is connected to the linear side of the 6th arranging means(30*e*) configured as above so as to form a coaxial line with the 6th arranging means(30*e*). FIG. 14 is a front view roughly showing the laminating means(120) selected according to the present invention. As shown in FIG. 14, a plurality of upper and lower bonding rollers(122, 122*a*), driven by a driving motor(M13), are installed axially on a frame(121) so as to be kept at a specified interval(as large as materials pass through). A clearance formed between the upper and lower upper and lower bonding rollers(122, 122*a*) must be level with the supplying roller(32) provided by the 6th arranging means (30*e*) so that materials fed from the 6th arranging means (30*e*) are admitted smoothly to the clearance between the upper and lower bonding rollers(122, 122*a*). A protective film(123) to be loaded on the top of a frame(121) in a wound state is mounted so as to be wound around the upper bonding roller(122) so that the protective film(123) can be properly unwound by the driving of the upper bonding roller(122).

The 7th arranging means(30*f*) is connected to the linear side of the laminating means(120) configured as above so as to form a coaxial line with the laminating means(120). FIGS. 4A and 4B are a front view and a plan view, respectively, roughly showing the 7th arranging means(30*f*) selected according to the present invention. As shown in FIGS. 4A and 4B, a plurality of supplying rollers(32), which are driven by a driving motor(M3), are installed axially on a frame(31), so as to be level with the bonding rollers(122, 122*a*) provided by the laminating means(120) so that materials with the synthetic resin film taped on the printed surface are smoothly fed to the supplying roller(32). A fixing pin(33) is mounted in one side of the 7th arranging means(30*e*), and a positioning pin(35), expansible back and forth by a cylinder(34), is mounted on the other opposite side.

Figure 15A:
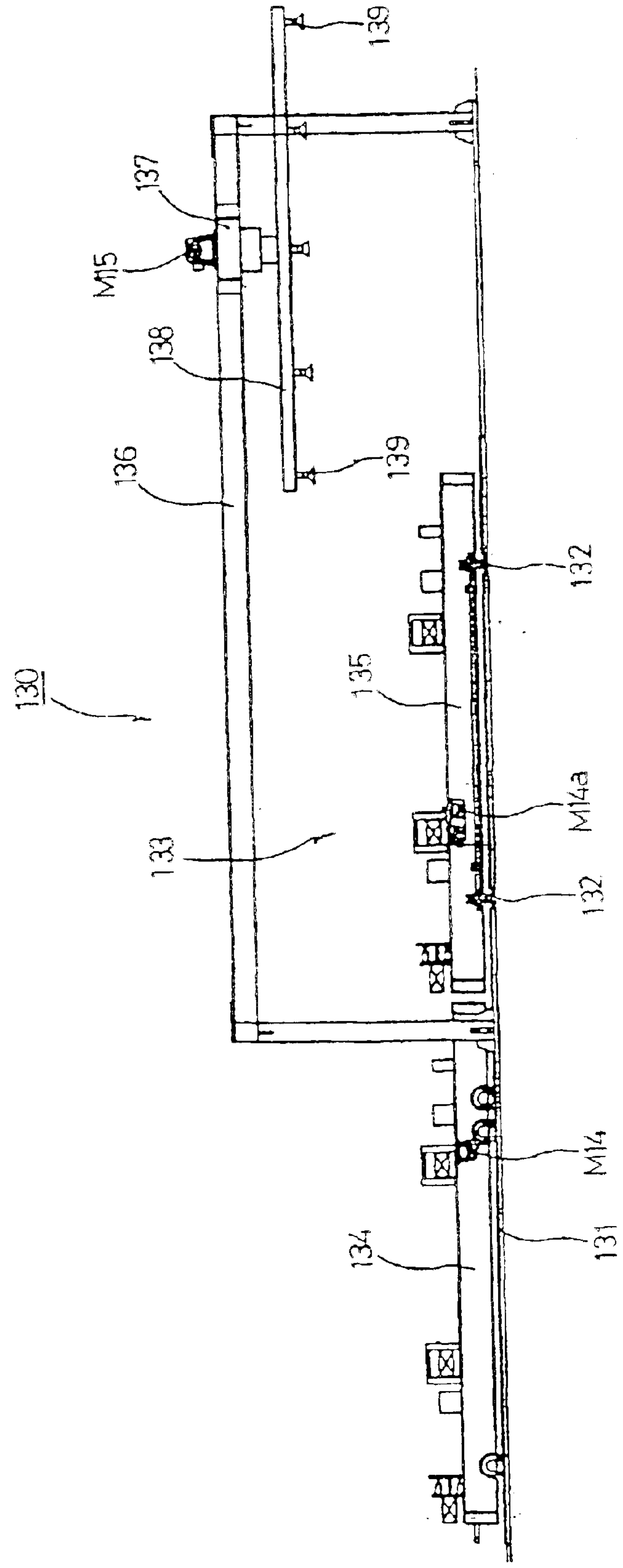
FIG. 15A is a front view roughly showing the receiving means selected according to the present invention.
Figure 15B:
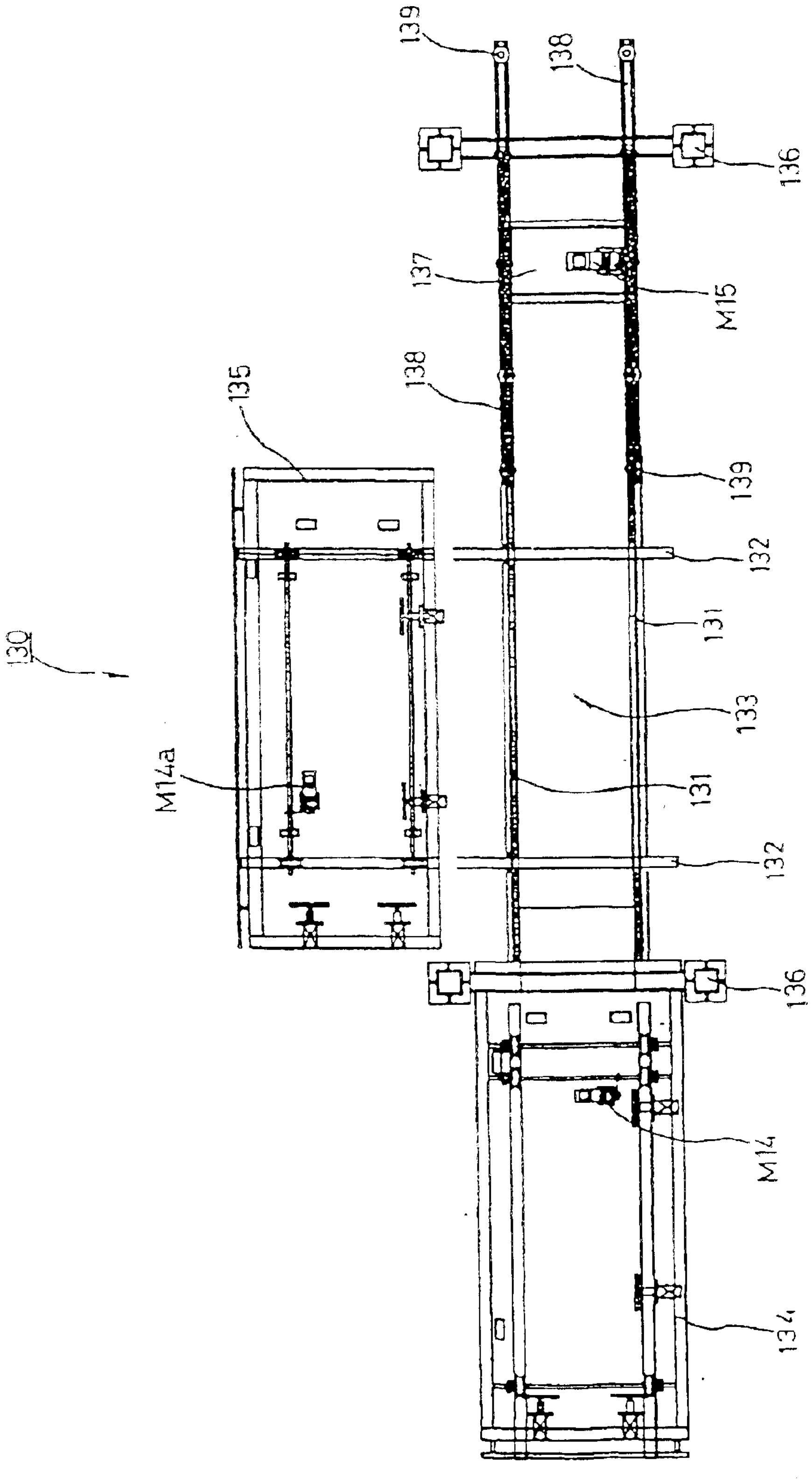
FIG. 15B is a plan view roughly showing the receiving means selected according to the present invention presents.

The receiving means(130) is connected to the 7th arranging means(30*f*) configured as above. FIGS. 15A and 15B are a front view and a plan view, respectively, roughly showing the receiving means(130) selected according to the present invention. As shown in FIGS. 15A and 15B, two sets of guide rails(131, 132) are installed so as to be perpendicularly across, between which the collecting area(133) is formed and on which collecting magazines(134, 135) are placed on the guide rails(131, 132) so that the collecting magazines (134, 135) go into the collecting area(133) in turn by means of driving motors(M14, M14*a*). A collecting frame(36) is installed across over the top of both the collecting area(133) and the 7th arranging means(30*f*), on which a collecting cart(137), movable up and down from the collecting area (133) to the top of the 7th arranging means by a driving motor(15), is placed. A liftable collecting arm(138) is installed on the collecting cart(137). A plurality of air pads(139) are mounted at the bottom of the collecting arm(138) for carrying materials.

What is claimed is:

1. A multicolored manufacturing method comprising;

the 1st process for printing on the surface of a steel sheet in the 1st single color, with the screen having a desired design being in close contact with the surface of a steel sheet, by charging a dye of the 1st single color;

the 2nd process for drying the 1st color printed steel sheet at a temperature between 150° C. and 400° C. and making the dye dry and firmly stick fast to the surface of the steel sheet;

the 3rd process for forcedly cooling the steel sheet which went through the drying process to −10° C.~40° C. by means of an air conditioner or cooling fan so that the dye printed on the surface of the steel sheet is completely dried;

the 4th process for printing on the surface of the 1st color-printed and dried steel sheet in the 2nd single color, with the screen having a design being in the same series as that used in the 1st color printing, by charging a dye of the 2nd single color;

the 5th process for drying the 2nd color printed steel sheet at a temperature between 150° C. and 400° C. and making the dye dry and firmly stick fast to the surface of the steel sheet;

the 6th process for forcedly cooling the steel sheet which went through the drying process to −10° C.~40° C. by means of an cooling fan so that the dye printed on the surface of the steel sheet is completely dried;

the 7th process for printing on the surface of the steel sheet in the 3rd single color by charging a dye of the 3rd single color;

the 8th process for drying the 3rd color printed steel sheet at a temperature between 150° C. and 400° C. and making the dye dry and firmly stick fast to the surface of the steel sheet;

the 9th process for forcedly cooling the steel sheet which went through the drying process to −10° C.~40° C. by means of an air conditioner or cooling fan so that the dye printed on the surface of the steel sheet is completely dried;

the 10th process for printing on the surface of the 3rd color printed and dried steel sheet in the 4th single color, with the screen having a design being in the same series as that used in the 3rd color printing, by charging a dye of the 4th single color;

the 11th process for drying the 4th color printed steel sheet at a temperature between 150° C. and 400° C. and making the dye dry and firmly stick fast to the surface of the steel sheet;

the 12th process for forcedly cooling the steel sheet which went through the drying process to −10° C.~40° C. by means of an cooling fan so that the dye printed on the surface of the steel sheet is completely dried;

the 13th process for coating the surface of the printed and dried steel sheet with transparent, viscous paste in a uniform thickness;

the 14th process for drying the steel sheet coated with the paste at a temperature between 150° C. and 400° C. and making the paste dry and firmly stick fast to the dye printed on the surface of the steel sheet;

the 15th process for forcedly cooling the coated and dried steel sheet to −10° C.~40° C. by means of an cooling fan so that the paste coated on and dye printed on the surface of the steel sheet is completely dried; and the 16th process for laminating the surface of the steel sheet with a protective synthetic resin film.

2. A multicolored steel sheet manufacturing method as in claim 1 wherein a multicolored steel sheet having five colors or more is manufactured by repeating the printing processes.

3. A multicolored steel sheet manufacturing system comprising;

the charging means comprising a supplying frame(26) which is installed so as to be across over the top of the supply area(23) which is formed by two sets of perpendicularly crossing guide rails(21, 22) on which charging magazines(24, 25) are placed so as to go into said supply area(23) in turn, and a supplying cart(27) installed on said supplying frame(27);

the 1st arranging means(30), installed so as to be parallel with said supply area(23) of said charging means(20), having a plurality of supplying rollers(32) which are installed axially on a frame to be driven(31);

the 1st printing means(40), connected to the linear side of said 1st arranging means(30), having a workbench(42) which is installed on a frame(41) and a feeding belt(45) which is movable right and left and installed in both sides of said workbench(42);

the 1st feeding means(50), connected to the linear side of said 1st printing means(40), having a plurality of feeding rollers(52) which are installed axially on a frame to be driven(51);

the 1st drying & cooling means(60), connected to the linear side of said 1st feeding means(50), largely comprising a drying chamber(62) and a cooling chamber (64) which are enclosed by a drying casing(61) and a cooling casing(63), respectively, and across which a feeding belt(65) is installed;

the 2nd arranging means(30*a*), connected to the linear side of said 1st drying & cooling means(60), having a plurality of supplying rollers(32) which are installed axially on a frame to be driven(31);

the 1st discharging means(70), connected so as to be perpendicularly across said 2nd arranging means(30*a*), having a discharging frame(71), perpendicularly across said 2nd arranging means(30*a*), in one side of which a discharging area(78) is formed, a discharging cart(73) which is movable up and down and placed on said discharging frame(71), and a discharging magazine(76) which is provided with a caster(77) and located in said discharging area(78);

the 2and printing means(40*a*), connected to the linear side of said 2nd arranging means(30*a*), having a workbench (42) which is installed on a frame(41) and a feeding belt(45) which is movable right and left and installed in both sides of said workbench(42);

the 2nd feeding means(50*a*), connected to the linear side of said 2nd printing means(40*a*), having a plurality of feeding rollers(52) which are installed axially on a frame to be driven(51);

the 2nd drying & cooling means(60*a*), connected to the linear side of said 2nd feeding means(50*a*), largely comprising a drying chamber(62) and a cooling chamber(64) across which a feeding belt(65) is installed;

the 3rd arranging means(30*b*), connected to the linear side of said 2nd drying & cooling means(60*a*), having a plurality of supplying rollers(32) which are installed axially on a frame to be driven(31);

the 2nd discharging means(70*a*), connected so as to be perpendicularly across said 3rd arranging means(30*b*), having a discharging frame(71), perpendicularly across said 3rd arranging means(30*b*), in one side of which a discharging area(78) is formed, a discharging cart(73) which is movable up and down and placed on said discharging frame(71), and a discharging magazine(76) which is provided with a caster(77) and located in said discharging area(78);

the 3rd printing means(40*b*), connected to the linear side of said 3rd arranging means(30*b*), having a workbench (42) which is installed on a frame(41) and a feeding belt(45) which is movable right and left and installed in both sides of said workbench(42);

the 3rd feeding means(50*b*), connected to the linear side of said 3rd printing means(40*b*), having a plurality of feeding rollers(52) which are installed axially on a frame to be driven(51);

the 3rd drying & cooling means(60*b*), connected to the linear side of said 3rd feeding means(50*b*), largely comprising a drying chamber(62) and a cooling chamber(64) which are enclosed by a drying casing(61) and a cooling casing(63), respectively, and across which a feeding belt(65) is installed;

the 4th arranging means(30*c*), connected to the linear side, of said 3rd drying & cooling means(60*b*), having a plurality of supplying rollers(32) which are installed axially on a frame to be driven(31);

the 3rd discharging means(70*b*), connected so as to be perpendicularly across said 4th arranging means(30*c*), having a discharging frame(71), perpendicularly across said 4th arranging means(30*c*), in one side of which a discharging area(78) is formed, a discharging cart(73) which is movable up and down and placed on said discharging frame(71), and a discharging magazine(76) which is provided with a caster(77) and located in said discharging area(78);

the 4th printing means(40*c*), connected to the linear side of said 4th arranging means(30*c*), having a workbench (42) which is installed on a frame(41) and a feeding belt(45) which is movable right and left and installed in both sides of said workbench(42);

the 4th feeding means(50*c*), connected to the linear side of said 4th printing means(40*c*), having a plurality of feeding rollers(52) which are installed axially on a frame to be driven(51);

the 4th drying & cooling means(60*c*), connected to the linear side of said 4th feeding means(50*c*), largely comprising a drying chamber(62) and a cooling chamber(64) across which a feeding belt(65) is installed;

the 5th arranging means(30*d*), connected to the linear side of said 4th drying & cooling means(60*b*), having a plurality of supplying rollers(32) which are installed axially on a frame to be driven(31);

the 4th discharging means(70*c*), connected so as to be perpendicularly across said 5th arranging means(30*d*), having a discharging frame(71), perpendicularly across said 5th arranging means(30*d*), in one side of which a discharging area(78) is formed, a discharging cart(73) which is movable up and down and placed on said discharging frame(71), and a discharging magazine(76) which is provided with a caster(77) and located in said discharging area(78);

the coating means(80), connected to the linear side of said 5th arranging means(30*d*), having upper and lower feeding rollers(80) which are installed axially on a frame(81) to be driven;

the 1st turning means(90), connected to the linear side of said coating means(80), having a plurality of feeding rollers(92) which are installed axially on a frame(91) so as to be driven, and a plurality of quick feeding rollers(94) which are located between feeding rollers (92) and installed axially on a quick feeding plate(93) so as to be rotated in a direction perpendicular to the rotating direction of said feeding rollers(92) so that said quick feeding rollers(94) can be lifted by said quick feeding plate(93);

the drying means(100), connected to the linear side perpendicularly across said 1st turning means(90), having a drying chamber(102) which is enclosed by a casing (101) and within which a feeding belt(103) is installed so as to be driven;

the 2nd turning means(90*a*), connected to the linear side perpendicularly across said drying means(100), having a plurality of feeding rollers(92) which are installed axially on a frame(91) so as to be driven, and a plurality of quick feeding rollers(94) which are located between feeding rollers(92) and installed axially on a quick feeding plate(93) so as to be rotated in a direction perpendicular to the rotating direction of said feeding rollers(92) so that said quick feeding rollers(94) can be lifted by said quick feeding plate(93);

the preliminary drying means(110), connected to the linear side perpendicularly across said and turning means(90*a*), having a drying chamber(112) which is enclosed by a casing(111) and within which a feeding belt(113) is installed so as to be driven, a few blast fans(114) and a plural row of I.R heaters(115) which are mounted within said drying chamber(112), and a discharging fan(116) outside of said casing(111);

the 5th drying & cooling means (60*d*), connected to the linear side of said preliminary drying means(110), largely comprising a drying chamber(62) and a cooling chamber(64) which are enclosed by a drying casing(61)

and a cooling casing(63), respectively, and across which a feeding belt(65) is installed;

the 6th arranging means(30*e*), connected to the linear side of said 5th drying & cooling means(60*d*), having a plurality of supplying rollers(32) which are installed axially on a frame to be driven(31);

the 5th discharging means(70*d*), connected so as to be perpendicularly across said 6th arranging means(30*e*), having a discharging frame (71), perpendicularly across said 6th arranging means(30*e*), in one side of which a discharging area(78) is formed, a discharging cart(73) which is movable up and down and placed on said discharging frame(71), and a discharging magazine(76) which is provided with a caster(77) and located in said discharging area(78);

the laminating means(120), connected to the linear side of the 6th arranging means(30*e*), having a plurality of bonding rollers(122, 122*a*) which are installed axially on a frame(121) on which A protective film(123) being in a wound state is loaded and wound around the upper bonding roller(122);

the 7th arranging means(30*f*), connected to the linear side of said laminating means(120), having a plurality of supplying rollers(32) which a re installed axially on a frame to be driven(31);

the receiving means(130), connected to said 7th arranging means, comprising two sets of perpendicularly crossing guide rails(131, 132) between a collecting area(133) is formed, collecting, a magazines(134, 135) which are placed on said guide rails(131, 132) so that they go into said supply area(133) in turn, and a collecting cart(137) which is movable up and down cross the top of both said collecting area(133) and said 7th arranging means (30*f*).

4. A multicolored steel sheet manufacturing system as in claim 3 wherein said supplying cart(27) of said charging means(20) is movable back and forth by said supplying frame(27) and said supplying frame(26) and is provided with a supplying arm at the bottom of which there are a plurality of air pads (29).

5. A multicolored steel sheet manufacturing system as in claim 3 wherein said arranging means(30, 30*a*, 30*b*, 30*c*, 30*d*, 30*e*, 30*f*) is provided with a fixing pin(33) which is located in one side of the top of a frame(31), and a positioning pin(35) which is expansible back and forth by a cylinder on the other opposite side.

6. A multicolored steel sheet manufacturing system as in claim 3 wherein said printing means(40, 40*a*, 40*c*, 40*d*) is provided with a liftable screen frame which is installed on the top of a workbench(42) and a squeegee which is moved back and forth by a screen fixing member(46) and a driving motor(M5).

7. A multicolored steel sheet manufacturing system as in claim 3 wherein said drying and cooling means(60, 60*a*, 60*b*, 60*c*, 60*d*) has said drying chamber(62) with a plural row of I.R heaters(66), said cooling chamber(64) with a plural row of coolers(68), a discharge fan(69) which is installed outside of said drying chamber(61), and a cooling fan(69*a*) which is installed on the top of said cooling chamber(64).

8. A multicolored steel sheet manufacturing system as in claim 3 wherein said discharging cart(73) is provided with a liftable discharging arm(74) having air pads(75) at its bottom.

9. A multicolored steel sheet manufacturing system as in claim 3 wherein said coating means(80) having supplying rollers(84) which supply paste to feeding rollers(82) abutting said supplying rollers(84), and a supply nozzle for supplying the paste as coating material.

10. A multicolored steel sheet manufacturing system as in claim 3 wherein said drying means(100) has said drying chamber(102) with a plural row of I.R heaters(104) and a few blast fans(105), and a discharge fan(106) which is installed outside of said drying chamber(61).

11. A multicolored steel sheet manufacturing system as in claim 3 wherein said collecting cart of said receiving means has a liftable collecting arm(138) at the bottom of which there are a plurality of air pads(139) for carrying materials.

* * * * *